(12) United States Patent
Seay

(10) Patent No.: US 11,449,290 B2
(45) Date of Patent: Sep. 20, 2022

(54) CONTROL PLAN FOR PAPER, SHEET, AND BOX MANUFACTURING SYSTEMS

(71) Applicant: Georgia-Pacific Corrugated LLC, Atlanta, GA (US)

(72) Inventor: Robert Dennis Seay, San Diego, CA (US)

(73) Assignee: Georgia-Pacific Corrugated LLC, Atlanta, GA (US)

( * ) Notice: Subject to any disclaimer, the term of this patent is extended or adjusted under 35 U.S.C. 154(b) by 335 days.

(21) Appl. No.: 16/033,348

(22) Filed: Jul. 12, 2018

(65) Prior Publication Data

US 2019/0018629 A1  Jan. 17, 2019

Related U.S. Application Data

(60) Provisional application No. 62/596,964, filed on Dec. 11, 2017, provisional application No. 62/532,483, filed on Jul. 14, 2017.

(51) Int. Cl.
*G06F 3/12* (2006.01)
*B65H 35/02* (2006.01)

(52) U.S. Cl.
CPC ........... *G06F 3/1243* (2013.01); *B65H 35/02* (2013.01); *G06F 3/1204* (2013.01);
(Continued)

(58) Field of Classification Search
CPC . G06F 3/1243; G06F 3/1251; G06Q 10/0631; G06T 7/0004; H04N 1/00665–00679; H04N 1/00639
See application file for complete search history.

(56) References Cited

U.S. PATENT DOCUMENTS

| 2,318,937 A | 5/1943 | Goldney et al. |
| 3,058,869 A | 10/1962 | Cohen et al. |

(Continued)

FOREIGN PATENT DOCUMENTS

| CA | 1215568 A | 12/1986 |
| CA | 2152003 A1 | 12/1995 |

(Continued)

OTHER PUBLICATIONS

International Search Report and Written Opinion, PCT/US2018/041988, dated Nov. 7, 2018, 12 pages.

(Continued)

*Primary Examiner* — Nicholas Pachol

(57) ABSTRACT

Systems for providing efficient manufacturing of paper, sheet, and/or box products of varying size and structure, often with pre-applied print ("pre-print"), are provided herein. One or more controllers can be used to aggregate orders and information to prepare one or more control plans (e.g., reel maps, reel plans, etc.) for processing a roll of web product through the manufacturing process. The control plan may include a set of instructions for operating one or more systems within the manufacturing process to form the desired finished paper-based product. In such a regard, efficient manufacturing of various paper-based products, including corrugated boxes, folded carton, labels, flexible paper, industrial bags, plates, cups, décor, and many others, can be achieved. Further, efficient customer ordering/tracking, job aggregation, print imposition, corrugator planning, and tracking and adjustments throughout the manufacturing process are contemplated.

20 Claims, 18 Drawing Sheets

(52) U.S. Cl.
CPC .......... *G06F 3/1205* (2013.01); *G06F 3/1215* (2013.01); *G06F 3/1251* (2013.01); *G06F 3/1282* (2013.01); *G06F 3/126* (2013.01)

(56) References Cited

U.S. PATENT DOCUMENTS

| | | | |
|---|---|---|---|
| 3,667,252 A | 6/1972 | Nelson | |
| 3,667,353 A | 6/1972 | Ward, Jr. et al. | |
| 3,667,354 A | 6/1972 | Steinmetz | |
| 4,086,120 A | 4/1978 | Cosby et al. | |
| 4,287,797 A | 9/1981 | Seragnoli | |
| 4,387,614 A | 6/1983 | Evans | |
| 4,415,978 A | 11/1983 | Craemer et al. | |
| 4,545,780 A | 10/1985 | Martin | |
| 4,576,663 A | 3/1986 | Bory | |
| 4,604,083 A | 8/1986 | Barny et al. | |
| 4,737,904 A | 4/1988 | Ominato | |
| 4,847,775 A | 7/1989 | Roch et al. | |
| 5,117,610 A | 6/1992 | Hartman et al. | |
| 5,325,306 A | 6/1994 | Adachi et al. | |
| 5,458,062 A | 10/1995 | Goldberg et al. | |
| 5,705,020 A | 1/1998 | Chiari | |
| 5,727,748 A | 3/1998 | Prittie | |
| 5,802,974 A | 9/1998 | McNeil | |
| 5,816,994 A | 10/1998 | Hil et al. | |
| 5,822,208 A | 10/1998 | Bory | |
| 5,899,128 A | 5/1999 | Smithe et al. | |
| 5,918,519 A | 7/1999 | Schnabel et al. | |
| 5,926,825 A | 7/1999 | Shirakawa | |
| 6,070,396 A | 6/2000 | Rinaldi et al. | |
| 6,112,658 A | 9/2000 | Gunther et al. | |
| 6,125,374 A | 9/2000 | Terry et al. | |
| 6,149,565 A | 11/2000 | Meyer et al. | |
| 6,170,881 B1 | 1/2001 | Salmon et al. | |
| 6,188,490 B1 | 2/2001 | Miyake | |
| 6,207,242 B1 | 3/2001 | Hoffinan | |
| 6,234,943 B1 | 5/2001 | Copin | |
| 6,299,730 B1 | 10/2001 | Broek et al. | |
| 6,352,497 B1 | 3/2002 | Hensley et al. | |
| 6,378,862 B1 | 4/2002 | Rebeaud | |
| 6,450,381 B1 | 9/2002 | Ernst et al. | |
| 6,473,760 B1 | 10/2002 | Klatt et al. | |
| 6,481,709 B2 | 11/2002 | Gombau et al. | |
| 6,496,219 B1 | 12/2002 | Porret et al. | |
| 6,499,397 B2 | 12/2002 | Stern | |
| 6,606,947 B2 | 8/2003 | Frossard et al. | |
| 6,650,433 B1 | 11/2003 | Keane et al. | |
| 6,725,123 B1 | 4/2004 | Denuell | |
| 6,771,384 B1 | 8/2004 | Laverty et al. | |
| 6,791,707 B2 | 9/2004 | Laverty et al. | |
| 6,821,038 B2 | 11/2004 | Izawa | |
| 6,893,520 B2 | 5/2005 | Cummings et al. | |
| 6,934,046 B1 | 8/2005 | Nishikawa et al. | |
| 6,976,798 B2 | 12/2005 | Keane et al. | |
| 6,992,794 B2 | 1/2006 | Keane et al. | |
| 7,009,723 B1 | 3/2006 | Bartholet et al. | |
| 7,073,444 B2 | 7/2006 | Alonso et al. | |
| 7,093,540 B2 | 8/2006 | Giancaterino et al. | |
| 7,114,444 B2 | 10/2006 | Hutchinson et al. | |
| 7,133,149 B2 | 11/2006 | Keane et al. | |
| 7,145,670 B2 | 12/2006 | Keane et al. | |
| 7,154,627 B2 | 12/2006 | Nishikawa et al. | |
| 7,182,007 B2 | 2/2007 | Berge et al. | |
| 7,187,465 B2 | 3/2007 | Keane et al. | |
| 7,187,472 B2 | 3/2007 | Friedman et al. | |
| 7,187,995 B2 | 3/2007 | Floeder et al. | |
| 7,242,463 B2 | 7/2007 | Pilloud et al. | |
| 7,297,969 B1 | 11/2007 | Wolinsky et al. | |
| 7,307,749 B2 | 12/2007 | Nishikawa et al. | |
| 7,398,733 B2 | 7/2008 | De Vries et al. | |
| 7,469,872 B2 | 12/2008 | Compagnone et al. | |
| 7,495,796 B2 | 2/2009 | Keane et al. | |
| 7,542,155 B2 | 6/2009 | Paskalev et al. | |
| 7,726,899 B2 | 6/2010 | Clement | |
| 7,832,441 B2 | 11/2010 | Titz | |
| 7,855,799 B2 | 12/2010 | Shah | |
| 7,871,479 B2 | 1/2011 | Garland | |
| 7,949,566 B2 | 5/2011 | Fogelson | |
| 8,009,308 B2 | 8/2011 | Field | |
| 8,030,013 B2 | 10/2011 | Llovet et al. | |
| 8,045,147 B2 | 10/2011 | Toma et al. | |
| 8,059,290 B2 | 11/2011 | Kuroshima | |
| 8,060,234 B2 | 11/2011 | Hellstrom et al. | |
| 8,175,739 B2 | 5/2012 | Floeder et al. | |
| 8,241,454 B2 | 8/2012 | Kraus et al. | |
| 8,270,007 B2 | 9/2012 | Pandit et al. | |
| 8,310,696 B2 | 11/2012 | Gustafson et al. | |
| 8,390,872 B2 | 3/2013 | Abe et al. | |
| 8,418,614 B2 | 4/2013 | Whitelaw et al. | |
| 8,464,638 B2 | 6/2013 | Whiltelaw et al. | |
| 8,482,766 B2 | 7/2013 | Greene et al. | |
| 8,488,144 B2 | 7/2013 | Fujimori et al. | |
| 8,520,254 B2 | 8/2013 | Rai | |
| 8,531,721 B2 | 9/2013 | Minagawa | |
| 8,534,194 B2 | 9/2013 | Whitelaw et al. | |
| 8,630,013 B2 | 1/2014 | Minagawa | |
| 8,634,089 B2 | 1/2014 | Keane et al. | |
| 8,634,731 B2 | 1/2014 | Has et al. | |
| 8,732,003 B2 | 5/2014 | Keane et al. | |
| 8,733,222 B2 | 5/2014 | Borel et al. | |
| 8,757,479 B2 | 6/2014 | Clark et al. | |
| 8,783,144 B2 | 7/2014 | Compagnone et al. | |
| 8,817,324 B2 | 8/2014 | Giannetti et al. | |
| 8,834,334 B2 | 9/2014 | Palm et al. | |
| 8,842,313 B2 | 9/2014 | Harrington | |
| 8,887,637 B2 | 11/2014 | Huber et al. | |
| 8,891,126 B2 | 11/2014 | Tufano | |
| 8,931,410 B2 | 1/2015 | Noy | |
| 9,056,515 B2 | 6/2015 | Wingkono et al. | |
| 9,073,720 B2 | 7/2015 | Beguin et al. | |
| 9,108,382 B2 | 8/2015 | Gnan et al. | |
| 9,132,599 B2 | 9/2015 | Bober | |
| 9,152,362 B2 | 10/2015 | Keane et al. | |
| 9,278,555 B2 | 3/2016 | Torihara et al. | |
| 9,298,404 B2 | 3/2016 | Niblett, Jr. | |
| 9,298,706 B2 | 3/2016 | Magnell | |
| 9,325,860 B2 | 4/2016 | Lachajewski et al. | |
| 9,327,421 B2 | 5/2016 | Beguin | |
| 9,327,485 B2 | 5/2016 | Mann et al. | |
| 9,340,007 B2 | 5/2016 | D'Annunzio et al. | |
| 9,361,550 B2 | 6/2016 | Barros et al. | |
| 9,481,537 B2 | 11/2016 | Beguin et al. | |
| 9,518,362 B2 | 12/2016 | Bomstad et al. | |
| 9,539,828 B2 | 1/2017 | Yasinover et al. | |
| 9,645,774 B2 | 5/2017 | Keane et al. | |
| 9,663,261 B2 | 5/2017 | Azad et al. | |
| 9,898,232 B2 | 2/2018 | Has et al. | |
| 9,904,494 B2 | 2/2018 | Ujike | |
| 10,576,650 B2 | 3/2020 | Bayer et al. | |
| 2002/0014577 A1 | 2/2002 | Ulrich et al. | |
| 2002/0062751 A1 | 5/2002 | Bardet et al. | |
| 2002/0078847 A1 | 6/2002 | Bardet et al. | |
| 2002/0083857 A1 | 7/2002 | Bardet et al. | |
| 2002/0197091 A1 | 12/2002 | Otsuki | |
| 2003/0149747 A1 | 8/2003 | Rai et al. | |
| 2004/0041991 A1 | 3/2004 | Obertegger | |
| 2004/0042022 A1 | 3/2004 | Friedman et al. | |
| 2004/0150856 A1 | 8/2004 | Asai | |
| 2004/0182503 A1 | 9/2004 | Stadele | |
| 2004/0182504 A1 | 9/2004 | Stadele et al. | |
| 2004/0211330 A1 | 10/2004 | Clark et al. | |
| 2004/0211510 A1 | 10/2004 | Joseph, Sr. | |
| 2005/0000842 A1 | 1/2005 | Timmerman et al. | |
| 2005/0044550 A1 | 2/2005 | Perdu | |
| 2005/0085362 A1 | 4/2005 | Hutchinson et al. | |
| 2005/0141760 A1 | 6/2005 | Floeder et al. | |
| 2005/0209075 A1 | 9/2005 | Kocherga et al. | |
| 2005/0247173 A1 | 11/2005 | Alsten et al. | |
| 2006/0027303 A1 | 2/2006 | Hunter | |
| 2006/0090319 A1 | 5/2006 | Howe | |
| 2006/0148631 A1 | 7/2006 | Protocsnak et al. | |
| 2006/0222429 A1 | 10/2006 | Kurashina | |
| 2006/0257014 A1 | 11/2006 | Oi | |
| 2007/0120357 A1 | 5/2007 | Kapadi et al. | |

(56) References Cited

U.S. PATENT DOCUMENTS

| | | |
|---|---|---|
| 2007/0162326 A1 | 7/2007 | Weel et al. |
| 2007/0175350 A1 | 8/2007 | Crum |
| 2007/0289460 A1 | 12/2007 | Tang |
| 2008/0075488 A1 | 3/2008 | Moriyama et al. |
| 2008/0239381 A1 | 10/2008 | Oshima |
| 2008/0273224 A1 | 11/2008 | Maulsby et al. |
| 2008/0308215 A1 | 12/2008 | Kraus et al. |
| 2008/0308251 A1 | 12/2008 | Weyer et al. |
| 2009/0025002 A1 | 1/2009 | Rai |
| 2009/0080022 A1 | 3/2009 | Tsutsumi |
| 2009/0120563 A1 | 5/2009 | Titz |
| 2009/0217835 A1 | 9/2009 | Roszenblum |
| 2009/0218380 A1 | 9/2009 | Prittie |
| 2009/0243204 A1 | 10/2009 | Breunig et al. |
| 2009/0262159 A1 | 10/2009 | Lang |
| 2011/0122212 A1 | 5/2011 | Pettersson et al. |
| 2011/0149337 A1* | 6/2011 | Goetz ............... G06F 3/1211 358/1.15 |
| 2012/0019866 A1 | 1/2012 | Kuroshima |
| 2012/0053039 A1 | 3/2012 | Compagnone et al. |
| 2012/0148326 A1 | 6/2012 | Ipponyari et al. |
| 2012/0250047 A1 | 10/2012 | Prati |
| 2013/0029825 A1 | 1/2013 | Rich |
| 2013/0094033 A1* | 4/2013 | Giannetti ............ G06F 3/1251 358/1.6 |
| 2013/0139959 A1 | 6/2013 | Wang |
| 2013/0141763 A1 | 6/2013 | Giannetti et al. |
| 2013/0184133 A1 | 7/2013 | Sugimoto et al. |
| 2013/0184134 A1 | 7/2013 | Suzuki et al. |
| 2013/0203579 A1 | 8/2013 | Vermunt |
| 2013/0209750 A1 | 8/2013 | Van Berlo |
| 2013/0286410 A1* | 10/2013 | Yasinover ............ H04N 1/387 358/1.2 |
| 2014/0000785 A1 | 1/2014 | Gnan et al. |
| 2014/0067104 A1 | 3/2014 | Osterhout |
| 2014/0162862 A1 | 6/2014 | Shimura et al. |
| 2014/0182470 A1 | 7/2014 | Clarke et al. |
| 2014/0251170 A1 | 9/2014 | Chiari et al. |
| 2014/0274643 A1 | 9/2014 | Clark et al. |
| 2014/0293297 A1 | 10/2014 | Nagahara |
| 2014/0297357 A1 | 10/2014 | Zeng et al. |
| 2014/0376043 A1 | 12/2014 | Tsujita |
| 2015/0022845 A1 | 1/2015 | Roscoe et al. |
| 2015/0090140 A1 | 4/2015 | Rancourt et al. |
| 2015/0101740 A1 | 4/2015 | Morales Garcia de la Vega et al. |
| 2015/0115976 A1 | 4/2015 | Adams et al. |
| 2015/0221077 A1 | 8/2015 | Kawabata et al. |
| 2015/0291382 A1 | 10/2015 | Moh |
| 2015/0292155 A1 | 10/2015 | Bomstad et al. |
| 2016/0004249 A1 | 1/2016 | Cummings et al. |
| 2016/0008998 A1 | 1/2016 | Denisse et al. |
| 2016/0016324 A1 | 1/2016 | Bapst et al. |
| 2016/0121572 A1 | 5/2016 | Giancaterino |
| 2016/0231966 A1 | 8/2016 | Ujike |
| 2016/0286064 A1 | 9/2016 | Numao et al. |
| 2016/0306595 A1 | 10/2016 | Has et al. |
| 2016/0318297 A1 | 11/2016 | Whitelaw et al. |
| 2016/0361886 A1 | 12/2016 | Suzuki et al. |
| 2017/0043570 A1 | 2/2017 | Bastici et al. |
| 2017/0057771 A1 | 3/2017 | Clement |
| 2017/0087793 A1 | 3/2017 | Mark et al. |
| 2017/0087794 A1 | 3/2017 | Bayer et al. |
| 2017/0087879 A1 | 3/2017 | Mark |
| 2017/0180598 A1 | 6/2017 | Nagahara |
| 2017/0308335 A1 | 10/2017 | Keane et al. |
| 2017/0344316 A1 | 11/2017 | Keane et al. |
| 2018/0000842 A1 | 1/2018 | Dhuppad et al. |
| 2018/0009616 A1 | 1/2018 | Kodama et al. |
| 2018/0037037 A1 | 2/2018 | Takagi et al. |
| 2018/0200906 A1 | 7/2018 | Senoco |
| 2018/0215061 A1 | 8/2018 | Bayer et al. |
| 2018/0250971 A1 | 9/2018 | Singla et al. |
| 2018/0253263 A1 | 9/2018 | Hower et al. |
| 2018/0345619 A1* | 12/2018 | Lang ............... B31F 1/2831 |
| 2019/0016081 A1 | 1/2019 | Widner et al. |
| 2019/0016551 A1 | 1/2019 | Seay et al. |
| 2019/0018628 A1 | 1/2019 | Sloan et al. |
| 2019/0024315 A1 | 1/2019 | Bomstad et al. |
| 2019/0084266 A1 | 3/2019 | Grünwald et al. |
| 2019/0193368 A1 | 6/2019 | Eder et al. |
| 2020/0114668 A1 | 4/2020 | Havive et al. |

FOREIGN PATENT DOCUMENTS

| | | |
|---|---|---|
| CA | 2398171 A1 | 8/2001 |
| CN | 101124528 A | 2/2008 |
| CN | 201030576 Y | 3/2008 |
| CN | 101219723 A | 7/2008 |
| CN | 101977777 A | 2/2011 |
| CN | 102173162 A | 9/2011 |
| CN | 103286812 A | 9/2013 |
| CN | 203307684 U | 11/2013 |
| CN | 103465509 A | 12/2013 |
| CN | 103879026 A | 6/2014 |
| CN | 203919153 U | 11/2014 |
| CN | 106363962 A | 2/2017 |
| EP | 0875482 A1 | 11/1998 |
| EP | 0972639 B1 | 1/2000 |
| EP | 0983853 B1 | 3/2000 |
| EP | 1132203 B1 | 9/2001 |
| EP | 1243414 B2 | 9/2002 |
| EP | 1 459 878 B1 | 9/2004 |
| EP | 1459878 A2 | 9/2004 |
| EP | 1593502 B1 | 11/2005 |
| EP | 1 655 116 A1 | 5/2006 |
| EP | 1916102 B2 | 4/2008 |
| EP | 1956456 A1 | 8/2008 |
| EP | 2100732 A1 | 9/2009 |
| EP | 2227396 B1 | 9/2010 |
| EP | 2250019 B1 | 11/2010 |
| EP | 2298552 B1 | 3/2011 |
| EP | 2428360 B1 | 3/2012 |
| EP | 2429781 B1 | 3/2012 |
| EP | 2429782 B1 | 3/2012 |
| EP | 2551117 A2 | 1/2013 |
| EP | 2611614 B1 | 7/2013 |
| EP | 2928651 A1 | 10/2015 |
| EP | 2964436 B1 | 1/2016 |
| EP | 3010717 B1 | 2/2017 |
| GB | 2102769 A | 2/1983 |
| GB | 2542569 A | 3/2017 |
| GB | 2542645 A | 3/2017 |
| JP | S62-290527 A | 12/1987 |
| JP | H07137720 A | 5/1995 |
| JP | 11165814 A | 6/1999 |
| JP | 2000118797 A | 4/2000 |
| JP | 2000153802 A | 6/2000 |
| JP | 2002113971 A | 4/2002 |
| JP | 2002/233990 A | 8/2002 |
| JP | 2002-273800 A | 9/2002 |
| JP | 2002304426 A | 10/2002 |
| JP | 2003-245894 A | 9/2003 |
| JP | 2004-82279 A | 3/2004 |
| JP | 2004-082279 A | 3/2004 |
| JP | 2007-245257 A | 9/2007 |
| JP | 2009154229 A | 7/2009 |
| JP | 2010158902 A | 7/2010 |
| JP | 4718981 B2 | 7/2011 |
| JP | 2012139952 A | 7/2012 |
| JP | 2015157375 A | 9/2015 |
| JP | 2015217535 A | 12/2015 |
| JP | 2016154008 A | 8/2016 |
| JP | 2017-035755 A | 2/2017 |
| KR | 2010-0138218 A | 12/2010 |
| KR | 10-1102628 B1 | 1/2012 |
| KR | 10-1518219 B1 | 5/2015 |
| TW | M271837 U | 8/2005 |
| WO | 2009/014818 A1 | 1/2009 |
| WO | WO 2012/065689 A1 | 5/2012 |
| WO | WO 2014/023487 A1 | 2/2014 |
| WO | WO 2014/206496 A1 | 12/2014 |
| WO | WO 2016/087053 A1 | 6/2016 |
| WO | WO 2016/165774 A1 | 10/2016 |
| WO | WO 2017/026135 A1 | 2/2017 |

(56) References Cited

FOREIGN PATENT DOCUMENTS

| WO | WO 2017/051146 A1 | 3/2017 |
| WO | WO 2017/131720 A1 | 8/2017 |
| WO | WO 2017/178228 A1 | 10/2017 |

OTHER PUBLICATIONS

International Search Report and Written Opinion, PCT/US2018/041990, dated Nov. 7, 2018, 13 pages.

International Search Report and Written Opinion, PCT/US2018/041992, dated Jan. 21, 2019, 20 pages.

International Search Report and Written Opinion, PCT/US2018/042000, dated Nov. 7, 2018, 10 pages.

Invitation to Pay Additional Fees and, Where Applicable, Protest Fee, PCT/US2018/041992, dated Nov. 28, 2018, 15 pages.

BHS Corrugator 4.0 Presentation (ICCA, Apr. 2015) 13 pages.

Chang et al., Proceedings of the 2003 Winter Simulation Conference, "Simulation-Based Scheduling Dynamic Discrete Manufacturing", retrieved from <https://www.researchgate.net/profile/Chin_Chong/publication/4053706_Dynamic_scheduling_I_simulation-based_scheduling_for_dynamic_discrete_manufacturing/links/0deec52a5c1c8a0a56000000/Dynamic-scheduling-I-simulation-based-scheduling-for-dynamic-discrete-manufacturing.pdf> 10 pages.

Lehtonen et al., Proceedings of the 2003 Winter Simulation Conference, "Simulation-Based Finite Scheduling at Albany International", retrieved from <https://pdfs.semanticscholar.org/71ab/4037976abb74e3874a158892e24254044970.pdf> 7 pages.

HP Development Company; "Reinventing End-to-end Solutions with HP and Our Partners", Product Brochure, Published 2016, 24 pages.

Office Action received for CN Application No. 201880037361.X, dated Feb. 26, 2021, 33 Pages. (19 Pages of English Translation and 14 Pages of Official Notification).

Office Action received for JP Application No. 2020-500729, dated Jun. 7, 2022, 8 pages (04 Pages of English translation and 04 Pages of Official notification).

Office Action received for JP Application No. 2020-500840, dated Jun. 14, 2022, 12 pages (06 Pages of English translation and 06 Pages of Official notification).

\* cited by examiner

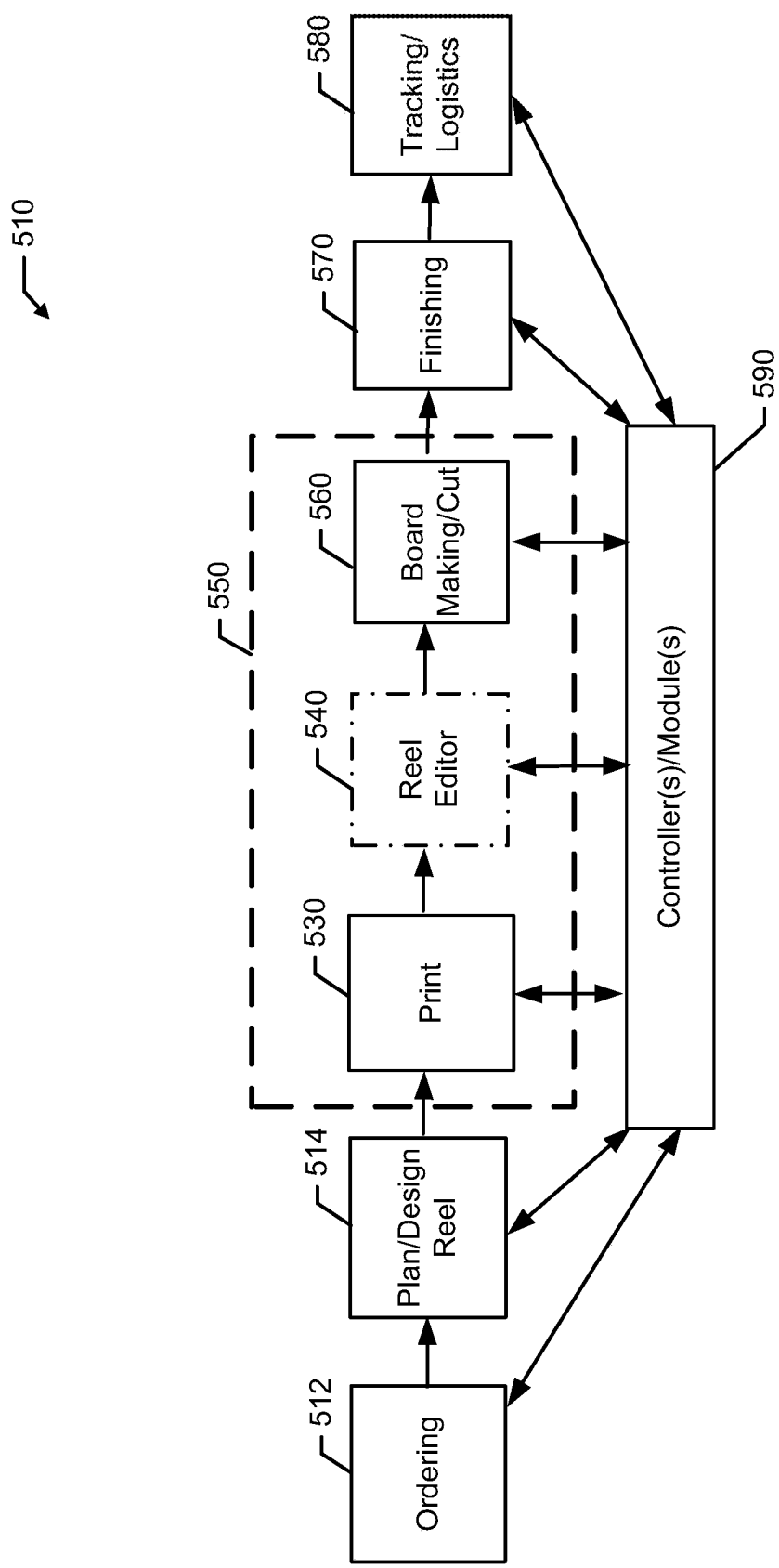

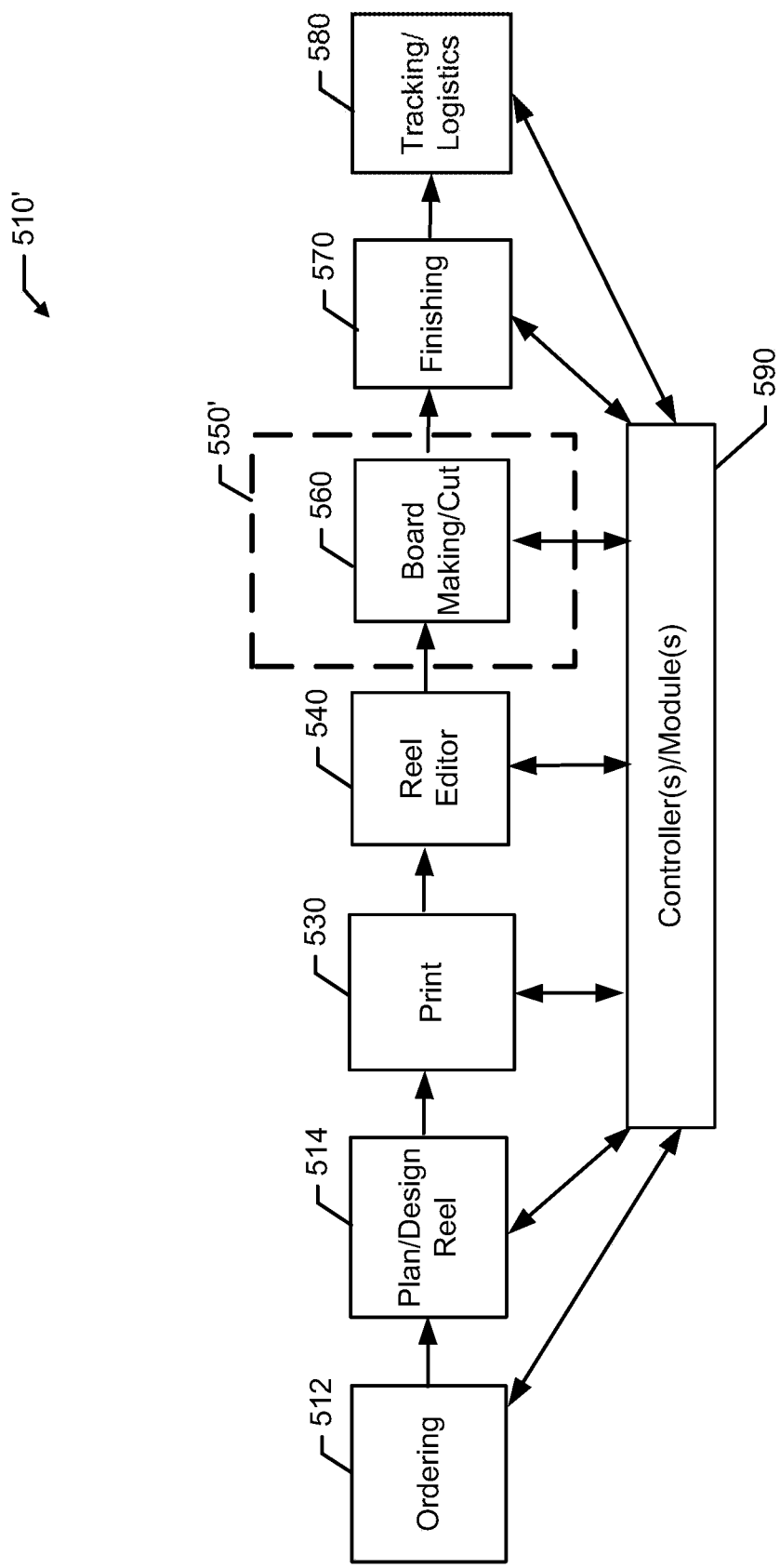

CONTROL PLAN FOR PAPER, SHEET, AND BOX MANUFACTURING SYSTEMS

CROSS REFERENCE TO RELATED APPLICATIONS

This application claims priority to U.S. Provisional Patent Application No. 62/596,964, entitled "Digital Pre-Print Paper, Sheet, and Box Manufacturing Systems", filed Dec. 11, 2017; and U.S. Provisional Patent Application No. 62/532,483, entitled "Digital Pre-Print Paper, Sheet, and Box Manufacturing Systems", filed Jul. 14, 2017, each of which is hereby incorporated by reference in its entirety.

FIELD OF THE INVENTION

Example embodiments of the present invention generally relate to paper, sheet and box manufacturing systems and, more particularly, to pre-print paper, sheet and box manufacturing systems.

BACKGROUND

Paper, sheet, and/or box and other manufacturing systems include many different systems and/or phases to form a finished paper-based product. Some such manufacturing may utilize print systems that print one or more images (e.g., symbols, marketing indicia, product information, etc.) on the product. For example, a roll of web product may pass through a printing press and receive one or more images. Such printing may occur after sheet formation/processing (e.g., after forming a layered corrugate), often being called "post-print". Alternatively, such printing may occur prior to sheet formation/processing (e.g., on a top layer prior to formation of the layered corrugate), often being called "pre-print". Once printed on, the roll of web product can pass through various sheet formation processing and/or finishing systems to ultimately form the finished paper-based product.

BRIEF SUMMARY

Some embodiments of the present invention provide systems for controlling manufacturing processes for one or more paper-based products. In this regard, some of the systems described herein may be utilized for any paper-based products, including with printed images. While some of the description herein of example embodiments focuses on corrugated box manufacturing, some embodiments of the present invention are contemplated for extension into other product manufacturing, including other paper-based product manufacturing, such as folded carton, beverage, labels, flexible paper, industrial bags, plates, cups, décor, and many others.

Some embodiments of the present invention contemplate a designed platform with various modules that can be used throughout the manufacturing process. For example, one or more controllers can be used to aggregate orders and information to prepare one or more control plans (e.g., reel maps, reel plans, etc.) for processing a roll of web product through the manufacturing process. The control plan may include a set of instructions for operating one or more systems within the manufacturing process to ultimately form the desired finished paper-based product. In such a regard, some embodiments contemplate one or more controllers that can generate and provide a control plan to various devices/systems for performing efficient manufacturing of various paper-based products, including corrugated boxes, folded carton, labels, flexible paper, industrial bags, plates, cups, décor, and many others.

With a central control plan, some embodiments of the present invention contemplate enabling on-the-fly adjustments/updating during the manufacturing process that can, among other things, avoid significant product waste, and signal back necessary production adjustments. For example, a more efficient selection and arrangement of orders within a control plan can be formed based on what orders are available and timelines are needed (e.g., mix and match where appropriate, fit in expedited orders, etc.).

In some embodiments, markings on the roll of web product can be used in conjunction with the control plan for operation of the various systems. In some embodiments, a computer-readable marking on the roll of web product may be "read" during the manufacturing process to cause efficient control of the various devices/systems. For example, by "reading" a marking and querying the control plan, a controller of a corrugator can know what sheet or box structure to make using the corrugator and where the sheet or box structure is across the web (e.g., the current position along the web). Thus, the knives, slitters, and scorers can be used by the corrugator to respectively cut, slit, and score at appropriate positions along the web.

The markings, in some embodiments, could be used in tracking the structures and/or roll of web product for positioning in proper stacks and/or determining completion status of an order, etc. The present invention contemplates many different types of markers (e.g., QR codes, bar codes, instructions themselves, etc.). Additionally or alternatively, in some embodiments color markings can be used to cause automated control, but with simple hardware and processing. In some sheet formation/processing systems, such as corrugators, simplistic three line "marks" are used to inform a knife when and where to cut. This approach, however, is limited—as all the cut marks look the same and, thus, the control plan for the corrugator operation has to be monitored closely and continually, and manually checked to confirm that the right sheet or box structures are being cut. The present invention contemplates using a similar three line mark, but utilizing different colors to portray an upcoming "change" to the corrugator (or other manufacturing system). In particular, in some embodiments, a vision system (e.g., detector) reads the color of each color marker. For example, when a different color is recognized, then the manufacturing system knows to "check" the control to determine how to operate. For example, the control plan may tell, for example, a corrugator that a different position of the knife, slitter and/or scorer is needed, etc. In some embodiments, the colors could be matched to relative positions (and, in particular, changes) on the control plan, making identification of the current position along the control plan very easy.

In an example embodiment, a system for controlling manufacturing of one or more paper-based products is provided. The system comprises at least one printer configured to print on a roll of web product to form a roll of printed web product. The system further comprises at least one sheet formation/processing system that includes at least one cutting arrangement that is configured to cut a portion of the roll of printed web product. The system further comprises at least one controller configured to generate a control plan associated with the roll of web product for at least one order from among a plurality of orders for the one or more paper-based products. Each order of the plurality of orders comprises at least one design for at least one paper-based product. The at least one design includes one or more printed images. The control plan includes at least a set of first order instructions for forming one or more first paper-based products from the roll of web product for fulfilling a first order. The set of first order instructions comprises first plan instructions for forming one or more first sheet or box structure areas on the roll of web product. Each of the first sheet or box structure areas include a first printed image and are used to form the one or more first paper-based products. The controller is further configured to provide the control plan to the printer for controlling operation of the printer. The control plan includes printing instructions to control operation of the printer to cause the first printed image to print at a desired position within each of the first sheet or box structure areas on the roll of web product to form the roll of printed web product. The controller is further configured to provide the control plan to the sheet formation/processing system for controlling operation of the sheet formation/processing system. The control plan includes cutting instructions to control operation of the cutting arrangement to cause one or more first sheet or box structures with the first printed image therein to be cut from the roll of printed web product. The one or more first sheet or box structures with the first printed image therein are used to form the one or more first paper-based products for fulfilling the first order.

In some embodiments, the at least one sheet formation/processing system further includes a web formation device that is configured to use the roll of printed web product to form an updated web that includes at least one additional layer of material. The updated web is used to form the one or more first paper-based products.

In some embodiments, the system further comprises at least one finishing system for performing finishing operations on the one or more paper-based products. The at least one controller is configured to provide the control plan to the finishing system for controlling operation of the finishing system. The control plan includes finishing instructions to control operation of the finishing system to cause the one or more first paper-based products to be formed using the one or more first sheet or box structures.

In another example embodiment, a system for controlling manufacturing of one or more paper-based products is provided. The system comprises at least one controller configured to generate a control plan associated with a roll of web product for at least one order from among a plurality of orders for the one or more paper-based products. Each order of the plurality of orders comprises at least one design for at least one paper-based product. The at least one design includes one or more printed images. The control plan includes at least a set of first order instructions for forming one or more first paper-based products from the roll of web product for fulfilling a first order. The set of first order instructions comprises first plan instructions for forming one or more first sheet or box structure areas on the roll of web product. Each of the first sheet or box structure areas include a first printed image and are used to form the one or more first paper-based products. The controller is further configured to provide the control plan to at least one printer for controlling operation of the printer. The control plan includes printing instructions to control operation of the printer to cause the first printed image to print at a desired position within each of the first sheet or box structure areas on the roll of web product to form a roll of printed web product. The controller is further configured to provide the control plan to at least one sheet formation/processing system for controlling operation of the sheet formation/processing system. The at least one sheet formation/processing system includes at least one cutting arrangement that is configured to cut a portion of the roll of printed web product. The control plan includes cutting instructions to control operation of the cutting arrangement to cause one or more first sheet or box structures with the first printed image therein to be cut from the roll of printed web product. The one or more first sheet or box structures with the first printed image therein are used to form the one or more first paper-based products for fulfilling the first order.

In some embodiments, the at least one sheet formation/processing system further includes a web formation device that is configured to use the roll of printed web product to form an updated web that includes at least one additional layer of material, wherein the updated web is used to form the one or more first paper-based products.

In some embodiments, the at least one sheet formation/processing system comprises a corrugator that is configured to form corrugated board web using the roll of printed web product, wherein the first paper-based product is a corrugated box with the first printed image.

In some embodiments, the at least one controller is configured to provide the control plan to at least one finishing system for controlling operation of the finishing system. The control plan includes finishing instructions to control operation of the finishing system to cause the one or more first paper-based products to be formed using the one or more first sheet or box structures. In some embodiments, the at least one controller is configured to determine if the one or more first paper-based products formed by the finishing system satisfies the first order. In some embodiments, the finishing system comprises a folding device that is configured to fold and glue the one or more first sheet or box structures for use in formation of the one or more first paper-based products, wherein the one or more first paper-based products are one or more folded cartons that each include at least the first printed image. In some embodiments, the finishing system comprises a tubing device that is configured to form the one or more first sheet or box structures into a tube and a bottoming device that is configured to form a bottom of the tube for use in formation of the one or more first paper-based products, wherein the one or more first paper-based products are one or more industrial bags that each include at least the first printed image. In some embodiments, the finishing system comprises a cup forming device that is configured to form the one or more first sheet or box structures into one or more cups, wherein the one or more first paper-based products are one or more cups that each include the first printed image. In some embodiments, the finishing system comprises a plate forming device that is configured to form the one or more first sheet or box structures into one or more plates, wherein the one or more first paper-based products are one or more plates that each include the first printed image.

In some embodiments, the at least one controller is configured to provide the control plan to at least one reel editor for controlling operation of the reel editor, wherein the control plan includes editing instructions to control operation of the reel editor to cause one or more portions of the roll of printed web product to be removed. In some embodiments, the at least one controller is configured to update the control plan based on the one or more portions of the roll of printed web product that were removed.

In some embodiments, the at least one controller is configured to receive one or more of the plurality of orders for the one or more paper-based products.

In some embodiments, the at least one controller is configured to track the one or more first sheet or box structures after formation.

In some embodiments, the at least one controller is configured to determine if the one or more first sheet or box structures formed by the sheet formation processing system satisfies the first order.

In some embodiments, the control plan for the roll of web product includes at least a set of second order instructions for forming one or more second paper-based products from the roll of web product for fulfilling a second order. The set of second order instructions comprises second plan instructions for forming one or more second sheet or box structure areas on the roll of web product. Each of the second sheet or box structure areas include a second printed image and are used to form the one or more second paper-based products. In some embodiments, the first plan instructions and the second plan instructions are configured to cause the one or more first sheet or box structure areas and the one or more second sheet or box structure areas to be formed adjacent to each other in a width direction on the roll of web product.

In yet another example embodiment, a method for controlling manufacturing of one or more paper-based products is provided. The method comprises generating a control plan associated with a roll of web product for at least one order from among a plurality of orders for the one or more paper-based products. Each order of the plurality of orders comprises at least one design for at least one paper-based product. The at least one design includes one or more printed images. The control plan includes at least a set of first order instructions for forming one or more first paper-based products from the roll of web product for fulfilling a first order. The set of first order instructions comprises first plan instructions for forming one or more first sheet or box structure areas on the roll of web product. Each of the first sheet or box structure areas include a first printed image and are used to form the one or more first paper-based products. The method further comprises controlling, using the control plan, at least one printer, wherein the control plan includes printing instructions to control operation of the printer to cause the first printed image to print at a desired position within each of the first sheet or box structure areas on the roll of web product to form a roll of printed web product. The method further comprises controlling, using the control plan, at least one sheet formation/processing system, wherein the at least one sheet formation/processing system includes at least one cutting arrangement that is configured to cut a portion of the roll of printed web product. The control plan includes cutting instructions to control operation of the cutting arrangement to cause one or more first sheet or box structures with the first printed image therein to be cut from the roll of printed web product. The one or more first sheet or box structures with the first printed image therein are used to form the one or more first paper-based products for fulfilling the first order.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4A shows a block diagram of an example corrugated sheet or box manufacturing process with print in-line with the corrugator, in accordance with some embodiments discussed herein;

FIG. 4B shows a block diagram of an example corrugated sheet or box manufacturing process with print off-line or near-line, before the corrugator, in accordance with some embodiments discussed herein;

DETAILED DESCRIPTION

Figure 1:
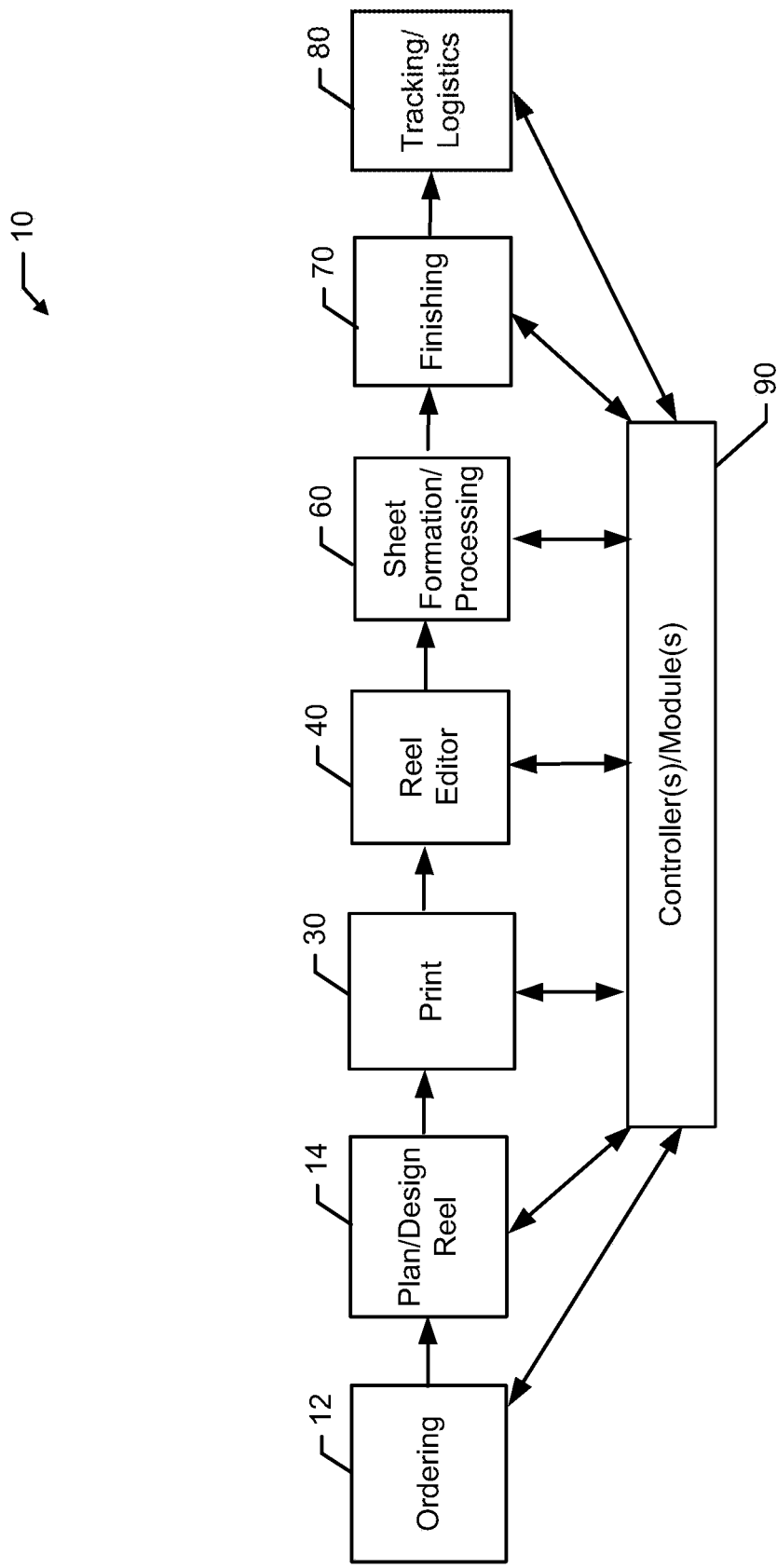
FIG. 1 shows a block diagram of an example paper, sheet, and/or box manufacturing process, in accordance with some embodiments discussed herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure.

Rather, these example embodiments are provided so that this disclosure will satisfy applicable legal requirements. Like reference numerals refer to like elements throughout.

Example Paper, Sheet, or Box and Other Manufacturing Process

FIG. 1 illustrates an example paper, sheet, or box manufacturing process 10 to form one or more paper-based products, according to various embodiments of the present invention. The manufacturing process 10 includes a number of phases that result in a finished product that is shaped and printed per the customer's order. The process 10 may include an ordering phase 12, a planning phase 14, a print phase 30, a reel editor phase 40, a sheet formation/processing phase 60, a finishing phase 70, and a tracking/logistics phase 80.

Depending on the desired configuration, one or more controller(s) 90 may be used to control one or more various phases (e.g., various systems/devices therein) of the manufacturing process 10. In some embodiments, less or more phases or different orders of phases are contemplated. Some embodiments of the present invention are contemplated for any type of paper, sheet, or box product manufacturing, including printed paper-based product manufacturing, such as corrugate, folded carton, beverage labels, flexible paper, industrial bags, plates, cups, décor, and many others.

In some embodiments, the controller 90 may be configured to control operation of one or more printing presses during the printing phase 30, operation of one or more reel editor(s) for one or more lanes during the reel editor phase 40, operation of various components used during the sheet formation/processing phase 60, and/or operation of various components used during the finishing phase 70. Likewise, the controller 90 may be used with the ordering phase 12 and/or during the tracking/logistics phase 80, such as described herein. In some embodiments, the controller 90 may be spread over any number of controllers at any of the various phases of the manufacturing process 10.

As described in more detail herein, the controller 90 provides logic and control functionality used during operation of various components/phases of the manufacturing process 10. In some embodiments, the functionality of the controller 90 may be distributed to several controllers that each provides more limited functionality to discrete portions of the operation of manufacturing process 10.

The controller 90 may comprise one or more suitable electronic device(s)/server(s) capable of executing described functionality via hardware and/or software control. In some embodiments, the controller 90 may include one or more user interfaces (not shown), such as for displaying information and/or accepting instructions. The controller 90 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 90 may include one or more processors coupled to a memory device. Controller 90 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, controller may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In this regard, in some embodiments, the controller 90 may be configured to execute computer program code instructions to perform aspects of various embodiments of the present invention described herein.

In the ordering phase 12, a customer may supply an order that includes desired characteristics for the end product. For example, the customer may provide a number of desired sheet, paper, or box structures (including for example labels, cartons, bags, plates, cups, décor, etc.), shape requirements, one or more images/designs for printing on the structures, color specifications, among many others. In some embodiments, the customer may input such an order through a web interface. The web interface may enable the customer to easily input the desired characteristics of the order electronically, such as forming a design for the desired end product(s). The web interface may also enable the customer to perform many related tasks, including, for example, updating orders, tracking orders, handling payment, requesting assistance, setting up automated ordering (e.g., recurring ordering), viewing and approving example images ("soft proofing"), viewing example end products, etc.

In addition to providing increased efficiency of process for the customer, the web interface may also directly interact with and provide information for automated processes useful in the remainder of the manufacturing process 10. For example, the information from the web interface may be fed directly into a controller 90 and utilized accordingly. For example, as described herein, the information from the web interface may be used to form a control plan (e.g., reel map, print plan, process plan, etc.) for a planned roll of web product (such as may be used to form the desired end product(s)). Additionally, however, the information from the web interface may be used to provide on-the-fly updates or adjustments to the manufacturing process. Further, feedback (e.g., from the controller 90) may be provided back to the web interface for the customer, such as tracking information, images of the completed sheet or box structures, among other things.

In some embodiments, the controller 90 may be configured to aggregate received orders, such as in one or more databases.

In some embodiments, the controller 90 (such as during the planning phase 14) may be configured to generate (e.g., form) a control plan associated with a roll of web product. In some embodiments, a control plan may be electronic-based (e.g., an electronic map/plan/table/listing/etc.) that is reference-able for determining how the various components of the manufacturing process 10 should operate—such as to form the desired product through the manufacturing process 10.

In some embodiments, the controller 90 may be configured to generate a control plan associated with a roll of web product for at least one order for the one or more paper-based products from among a plurality of orders. In this regard, each order of the plurality of orders may comprise at least one design for at least one paper-based product, and the design may include one or more printed images (such as for being printed on the desired product).

In some embodiments, the control plan includes one or more sets of order instructions. In some embodiments, each set of order instructions may correspond to a different order that is planned to be manufactured using the generated control plan. For example, a control plan may include a set of first order instructions for forming a first paper-based product from the roll of web product for fulfilling a first order. Additionally, in some embodiments, a control plan may have a second or more sets of order instructions, such as to control manufacturing of additional products. In some cases, depending on the size restrictions of the order and/or the systems used during the manufacturing process, the control plan may be generated such that different orders are positioned or planned to be adjacent to each other in a width direction (e.g., next to each other) on a roll of web product. Additionally or alternatively, the control plan may be generated such that different orders are positioned or planned to run one after the other in a length direction on a roll of web product.

The order instructions for the control plan for each order may include one or more instructions, specification, databases, etc. for enabling control and/or operation of various systems/devices of the manufacturing process 10. For example, the set of first order instructions may comprise first plan instructions for forming one or more first sheet or box structure areas on the roll of web product. Further, the first plan instructions may include one or more printed images for each of the first sheet or box structure areas. Ultimately, in some embodiments, the plan instructions (and other instructions) that form the set of order instructions may be used during the manufacturing process 10 to form the desired product.

In some embodiments, a control plan (such as through the plan instructions) may provide a layout of the order and/or arrangement of sheet or box structure areas on a roll of web product that are to be printed on, formed, and/or cut during the manufacturing process 10. For example, a control plan (e.g., reel map) for the section of web product 220 shown in FIG. 3A may include indications that there should be 4 structures (A, B, C, and D) that are arranged as shown. In some embodiments, the control plan (or a portion thereof) may be representable in visual form, such as to a person (or persons), which may be useful for manually checking the control plan for accuracy, efficiency, and/or operating the corrugator. In some embodiments, electronic verification of such checking could occur either with or without the visual representation of the control plan.

The manufacturing process 10 may also including the printing phase 30. Depending on the desired manufacturing process 10, digital print processes can be used, providing for enhanced image quality. During the printing phase 30, the controller 90 may direct the press digital front end (DFE) and raster image processor (RIP), etc., to print one or more images at specific locations on the web product. In some embodiments, the controller 90 may utilize the control plan to determine where on the web to print the images and/or markers. In some embodiments, the controller 90 may provide the control plan to the printer for operation thereof to cause the printer to print the desired image at an appropriate position on the roll of web product (e.g., within each sheet or box structure area)—thereby forming a roll of printed web product. For example, an image selected by the customer (such as a bottle), may be printed in the center (or other section) of a structure—such as may ultimately be visible for marketing or other purposes once the structure is formed. Any image (including, words, marks, instructions, etc.) is contemplated by various embodiments of the present invention.

In some embodiments, one or more markers can be printed on the web product, including any marker that may be used by various components of the manufacturing process 10, such as for tracking, cutting, printing, etc. Further description regarding possible markers and their utilization is provided in greater detail herein. In this regard, the controller 90 may be connected to one or more vision systems that are used to read or detect color, defects, structure, and various markers for controlling and/or operating various components/phases of the manufacturing process 10.

During the reel editor phase 40, the controller 90 may direct operation of a reel editor to edit (e.g., remove) waste from the roll of printed web product. For example, the controller 90 (such as during the print phase 30 and/or a separate/different phase) may be configured to determine waste that is on the roll of printed web product. Such waste could be unprinted sections of the roll and/or poor quality images/defects in the roll.

In some embodiments, the controller 90 is configured to provide the control plan to at least one reel editor for controlling operation of the reel editor. In such an example embodiment, the control plan may include editing instructions (e.g., within the set of order instructions) to control operation of the reel editor to cause one or more portions of the roll of printed web product to be removed. In some embodiments, the editing instructions may cause the reel editor to slit the roll of web product into more than one child roll (e.g., narrower in paper width) and/or to break the roll of web product into more than one child roll (e.g., narrower in paper roll diameter). Such child rolls may be designed for processing through various manufacturing systems downstream and may, in some instances, assist in tracking and/or order management.

Once edited, the controller 90 may determine and update the control plan to account for any removed waste and/or one or more newly formed child roll(s).

During the sheet formation/processing phase 60, the controller 90 may be configured to perform one or more processes to form and/or process the roll of web product in formation of the desired end product. In some embodiments, the controller 90 may be configured to provide the control plan to at least one sheet formation/processing system for controlling operation of the sheet formation/processing system. The sheet formation/processing system may include one or more systems for the formation/processing of the roll of web product, such as forming the roll of web product into one or more sheets (or structures) that may be utilized in the remainder of the manufacturing process 10.

As used herein, "sheet formation/processing" may refer to any formation or processing of a sheet or structure from a roll of web product, such as for example cutting/forming a rectangular shaped structure that can be, in some embodiments, further processed (e.g., in the finishing phase) to form (or help form) one or more paper-based products. In some embodiments, during the sheet formation/processing phase 60, the roll of web product (or portions thereof) may be formed into additional layered product that can be cut into sheets, such as when processed through a corrugator. In some embodiments, further processing may occur during the sheet formation/processing phase 60 and/or finishing phase 70. For example, the formed sheet may be die-cut, such as during either phase.

In some embodiments, the sheet formation/processing system may include a web forming device that is configured to use the roll of printed web product to form an updated web. The control plan (such as in the set of order instructions) may include web forming instructions to control operation of the web forming device to cause the updated web to be formed. In some example embodiments, the updated web may include additional layers of material (e.g., additional webs for added support, glue, fluting, lamination, etc.). In this regard, the updated web may be used for forming the desired end product.

In some embodiments, the sheet formation/processing system may include at least one cutting arrangement (e.g., one or more cutting devices) that is configured to cut a portion of the roll of printed web product. The control plan (such as in the set of order instructions) may include cutting instructions to control operation of the cutting arrangement to cause one or more sheet or box structures with the printed image therein to be cut from the roll of printed web product. In such an example, the one or more sheet or box structures with the first printed image therein may then be utilized to form the desired paper-based product for fulfilling the order.

For example, as described in greater detail herein, an example manufacturing process is corrugated box manufacturing and that manufacturing process may include a board making phase and/or cutting phase (see e.g., FIGS. 4A and 4B). In such an example, the board making phase may be performed under operation of one or more web forming devices (e.g., using a corrugator). Additionally, the cutting phase may be performed under operation of one or more cutting devices (e.g., using a corrugator). In some embodiments, other manufacturing processes are also contemplated—providing different sheet formation/processing phases 60, such as for use with carton formation, plate formation, cup formation, bag formation, etc.

Referring back to FIG. 1, with the sheets formed/processed, the manufacturing process 10 may continue to the finishing phase 70. The finishing phase 70 may include additional printing, additional cutting (e.g., die-cutting), additional scoring, additional gluing, and/or other necessary functions to achieve a finished product for sending to the customer.

In some embodiments, the controller 90 is configured to provide the control plan to at least one finishing system for controlling operation of the finishing system. The control plan (such as in the set of order instructions) may include finishing instructions to control operation of the finishing system to cause one or more products to be formed, such as using the sheets from the sheet formation/processing phase.

In some embodiments, the finishing system may comprise a die-cutter for forming a shaped sheet and/or product. In such an example, the finishing instructions from the control plan may cause the die-cutter to cut the sheet and/or roll from the sheet formation/processing phase 60 into a desired shape.

In some embodiments, the finishing system may comprise a folding/gluing device that is configured to fold and/or glue the one or more sheet or box structures for use in formation of the one or more desired products (e.g., folded cartons). In such an example, the finishing instructions from the control plan may cause the folding device to fold and glue the one or more sheet or box structures into the one or more folded cartons.

In some embodiments, the finishing system may comprise a tuber device that is configured to form the one or more sheet or box structures into one or more tubes and/or a bottoming device that is configured to form a bottom for each of the one or more tubes for use in formation of the desired products (e.g., an industrial bag). In such an example, the finishing instructions from the control plan may cause the tuber device to form the one or more sheet or box structures into one or more tubes and the bottoming device to form a bottom of each tube for use in formation of the desired product.

In some embodiments, the finishing system may comprise a cup forming device that is configured to form the one or more sheet or box structures into one or more desired products (e.g., cups). In such an example, the finishing instructions from the control plan may cause the cup forming device to form the one or more sheet or box structures into one or more cups.

In some embodiments, the finishing system may comprise a plate forming device that is configured to form the one or more sheet or box structures into one or more desired products (e.g., paper plates). In such an example, the finishing instructions from the control plan may cause the plate forming device to form the one or more sheet or box structures into one or more plates.

In some embodiments, the controller 90 is configured to determine if the one or more products formed by the finishing system satisfy a particular order. For example, in some embodiments, a vision system or other visual inspection system may be used to confirm accuracy and/or separating of the order(s) during the manufacturing process.

The manufacturing process 10 may also include a tracking/logistics phase 80 that includes tracking the finished sheet or box structures and/or preparing/delivering them to the customer. In some embodiments, one or more tracking or counting systems can be implemented upstream in the manufacturing process 10, such as to enable tracking/logistic planning throughout the manufacturing process 10. In such a regard, in some embodiments, the controller 90 is configured to track one or more webs/sheets/products during the manufacturing process 10. In some embodiments, unique codes based on the product type (e.g., corrugate, folded carton, industrial bag, plate, cup, décor, etc.) may be used to differentiate control plans and manufacturing processes.

Example Platform for Managing Manufacturing

Figure 2:
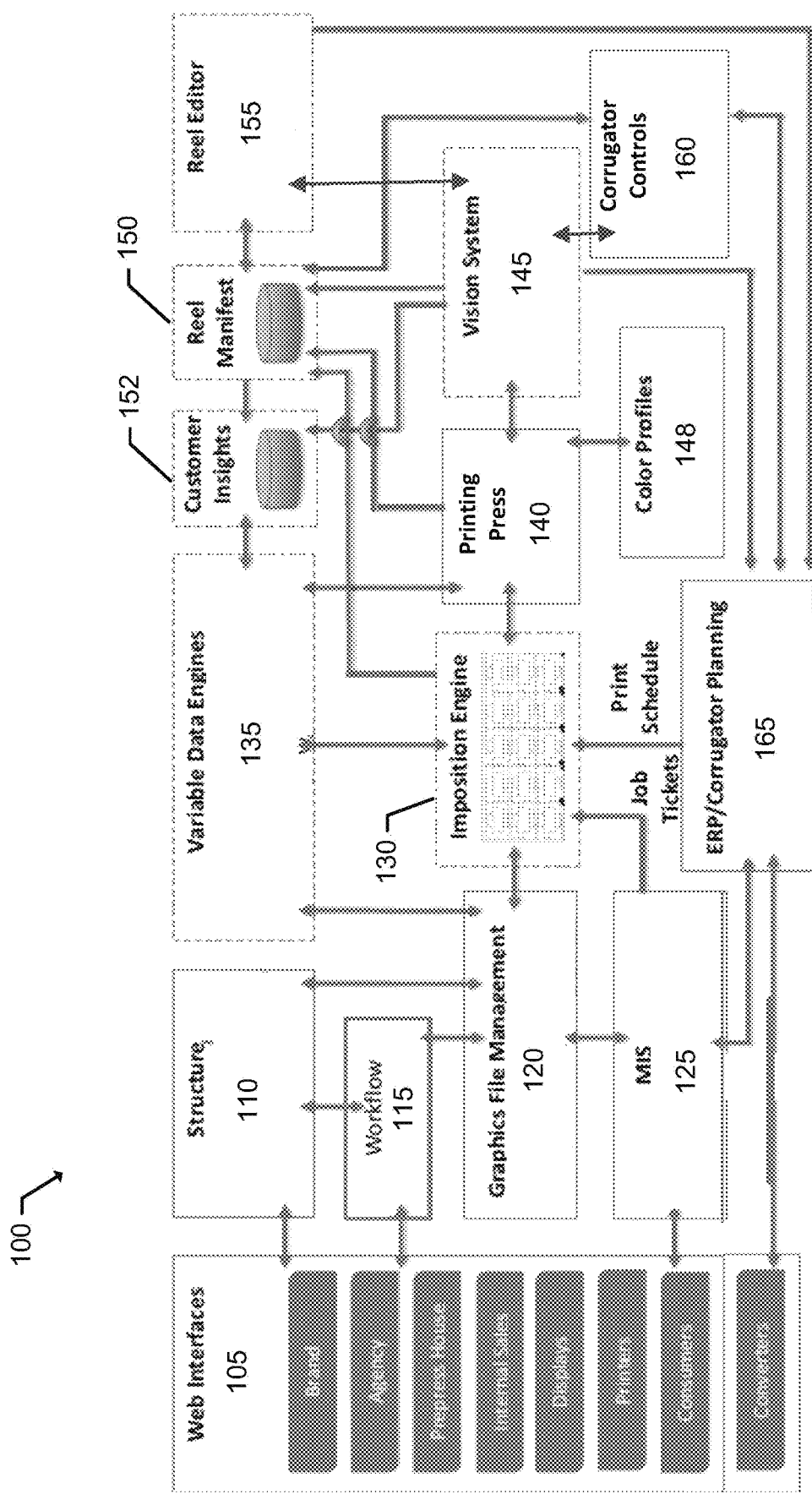
FIG. 2 shows an example platform for various aspects of an example corrugated box manufacturing process, in accordance with example embodiments described herein.

FIG. 2 illustrates an example platform 100 for managing paper, sheet, or box manufacturing according to various embodiments of the present invention. Though some of the following description is provided for example corrugated box manufacturing, some embodiments of the present invention contemplate use of the platform (or various aspects of the platform) for any product manufacturing, such as corrugated boxes, folded carton, beverage containers, labels, flexible paper, industrial bags, plates, cups, décor, and many others.

The platform 100 includes a number of platform modules that interact with each other to form an integrated platform that provides efficient manufacturing processes. In the depicted embodiment, the platform 100 includes a web interface module 105, a structure module 110, a graphics file workflow module 115, a graphics file management module 120, a management information systems (MIS) module 125, an imposition engine module 130, a variable data engine module 135, a press module 140, a color management module 148, a press vision system module 145, a reel manifest module 150, a customer insights module 152, a reel editor module 155, a corrugator controls module 160, and an enterprise resource planning (ERP)/corrugator planning module 165. As described herein, the various modules each contain features that are designed to work together to provide an integrated, efficient platform 100 for manufacturing corrugated sheet or box structures for customers. In some embodiments, the controller 90 may be configured to communicate with and/or control operation of many of the various modules. While the depicted embodiment shows various particular modules, some embodiments of the present invention contemplate many variations, including additional modules and combinations in whole or part of shown modules to form a platform.

The web interface module 105 may be configured to provide for interaction between customers, users, and the platform 100. For example, the web interface module 105 may be configured to provide an interface for a customer to provide information to the platform 100, such as orders, changes to orders, payments, etc. The web interface module may also enable additional features, such as enabling a customer to print samples, upload their own art/images, track orders, among other things. Additionally, however, the web interface module 105 may be helpful for internal use, such as for tracking sales. The internal web interface may display pertinent information to the company, such as trends, etc. The web interface module 105 may communicate, for example, with the structure module 110, the workflow module 115, the management information systems module 125, and/or the ERP/corrugator planning module 165.

The structure module 110 may be configured to enable selection and design of the structures planned for manufacture. For example, the structure module 110 may enable selection of the types of boxes (e.g., the material, number of layers, flute medium, etc.). Additionally, the size and shape of the sheet or box structure may be configured using the structure module 110. In some embodiments, preferred structure specifications may be stored by the structure module 110. Further, rules or other constraints may be communicated to the customer and/or utilized in determination of the sheet or box structure specifications. The structure module 110 may communicate, for example, with the web interface module 105, the workflow module 115, and/or the graphics file management module 120.

The workflow module 115 may be configured to help process the flow of graphics orders and facilitate input of the orders into the structure module 110 and the graphics file management module 120. In this regard, the workflow module 115 may communicate with the web interface module 105, the structure module 110, and/or the graphics file management module 120.

The graphics file management module 120 may be configured to help process the graphics files for use in designing and printing on the sheet or box structures. For example, the graphics file management module 120 may include a repository of available images. Likewise, the graphics file management module 120 may store new images uploaded by the customer. Further, the graphics file management module 120 may include rules or other feature constraints that can be communicated to the customer and/or implemented when forming the orders. The graphics file management module 120 may communicate, for example, with the structure module 110, the workflow module 115, the management information system module 125, the color management module 148, and/or the imposition engine 130.

The management information system module 125 may be configured to store, process, and organize the information for the platform 100. For example, the management information systems module 125 is configured to receive and organize the orders, other customer requests, and internal information from the web interface module 105. Further, the data from the graphics file management module 120, imposition engine module 130, and enterprise resource planning (ERP)/corrugator planning module 165 may be stored and organized using the management information systems module 125. The management information systems module 125 may communicate, for example, with the web interface module 105, the graphics file management module 120, the imposition engine 130, and/or the ERP/corrugator planning module 165.

The enterprise resource planning (ERP)/corrugator planning module 165 may be configured to facilitate planning and implementation of the manufacturing process. In this regard, the ERP/corrugator planning module 165 may receive data from various features of the platform 100 and process the information to plan out efficient manufacturing processes across the entire platform. For example, the ERP/corrugator planning module 165 may receive data from the web interface module 105, the management information systems module 125, the press module 140, the vision system module 145, the corrugator controls module 160, and reel editor module 155 to inform planning for future jobs. As an example, the management information systems module 125 may provide order information to the ERP/corrugator planning module 165, which can be utilized to form job tickets for the imposition engine module 130. The ERP/corrugator planning module 165 may also be configured to enable printing of schedules for jobs etc.—which may be used for tracking or other purposes. Such information, for example, may be used to provide information back to the customer, such as through the web interface module 105. The ERP/corrugator planning module 165 may communicate, for example, with the web interface module 105, the management information systems module 125, the imposition engine module 130, the press module 140, the vision system module 145, the reel editor module 155, and/or the corrugator controls module 160.

The imposition engine module 130 may be configured to plan out imposition of print objects (e.g., images or markers) and other variable data on the roll of web product. For example, the imposition engine module 130 may gather ready job tickets (e.g., customer orders), such as from the management information systems module 125 and/or ERP/corrugator planning module 165, for imposition across rolls of web product. Using the job tickets, the imposition engine module 130 may determine layouts for the webs that minimize waste and improve processes. In order to plan out and finalize impositions, the imposition engine module 130 may receive information from various other modules, such as the graphics file management module 120, the variable data engine module 135, and the reel manifest module 150.

In some embodiments, the imposition engine module 130 may provide the ability to test roll layouts and finalize acceptable roll layouts. In this regard, formation of the layouts may be optimized based on many different factors, including, for example, roll/sheet/finished box requirements, press limitations, downstream corrugation, die-cut optimization, among other things. After finalization, the imposition engine module 130 may be configured to pass the imposed layout to the press module 140 for printing.

The imposition engine module 130 may communicate, for example, with the graphics file management module 120, the management information systems module 125, the ERP/corrugator planning module 165, the variable data engine module 135, the reel manifest module 155, and the press module 140.

The variable data engine module 135 may be configured to manage markers and other variable data through the manufacturing process. As described herein, some embodiments of the present invention contemplate use of markers for automated control during the manufacturing process, such for automated control/operation of the reel editor. Depending on the configuration of the manufacturing process, different markers or other variable data may be utilized to achieve automated control. The variable data engine module 135 may be configured to track, organize, determine, and report on such markers or other variable data.

In some embodiments, the variable data engine module 135 may be a web-based back-office function that assigns/allocates, references, and/or reports on variable data/marker information utilization. Such a module may enable generation and allocation of group (multi-use) individual barcodes, quick response (QR) codes, watermarks, color markers, and general variable data. In some embodiments, the variable data engine module 135 may assign/allocate variable data/markers by various entities, such as brand, product type, printer type, converter type, corrugator, logistics supply chain, or other factors.

In some embodiments, the variable data engine module 135 may transfer such information to the imposition engine module 130 for imposing on the board or web layout. In some embodiments, downstream information can be provided back to and utilized by the variable data engine module 135, such as information from the vision system module 145, reel editor module 155, corrugator, finishing equipment, logistics control, retailer, brand, and/or customer. Likewise, status updates can be provided to and from the variable data engine module 135.

In some embodiments, the data generated by the variable data engine module 135 may be tracked and utilized for reporting and determination of optimized processes. Further analytics and usage reporting may be generated. Along these lines, such information and learnings may be applicable to manufacturing of other products, such as also contemplated herein.

The variable data engine module 135 may communicate, for example, with the graphics file management module 120, the imposition engine module 130, the customer insights module 152, and the press module 140.

The press module 140 may be configured to print objects (e.g., images and markers) on the roll of web product, such as during the printing phase 30 described herein. Depending on capabilities of the press, different image qualities and efficiencies may be achieved. The press module 140 may be configured to communicate with, for example, the imposition engine module 130, the variable data engine module 135, the reel manifest module 150, the vision system module 145, and the color profiles module 148.

The color management module 148 may be configured to store and provide color profile information for the press module 140. In this regard, the color profiles module 148 may manage specific color profiles for customers, presses, substrates, or other requirements, that are then used by the press during printing. The color management module 148 may be configured to communicate with, for example, the graphics file management module 120 and the press module 140.

The vision system module 145 may be configured to perform many different types of vision (e.g., detection) related functions during the manufacturing process 10. In this regard, the vision system module 145 may be configured for use during the printing process and/or during use of the reel editor or other components of the manufacturing process 10. In describing such an example vision system module 145, some embodiments of the present invention contemplate separating described functions of the vision system module. For example, a portion of the vision system module 145 may be used during the printing process, while another portion of the vision system module 145 may be used in conjunction with operation of the reel editor or other component. Likewise, there may be separate functions performed by separate vision system related components (e.g., a visual inspection system may inspect the sheet or box structures for accuracy and a detector may detect one or more markers). As such, though described as one module, the following description is not meant to limit the structure of the modules of the platform 10, as there may be separate vision related modules as appropriate.

The vision system module 145 may be configured to detect information during the manufacturing process, such as during use of the printing process. In some embodiments, the vision system module 145 may be configured to detect possible defects and/or confirm accuracy of print jobs. In such a regard, high quality can be maintained (e.g., confirming color consistency on orders). For example, the vision system module 145 may detect defects, such as serious banding, print registration color-to-color, spit-on-page issues, bar/QR code scanability, over-print varnish issues.

In some embodiments, the vision system module 145 may be configured to detect information during the manufacturing process 10, including during the printing phase 30, reel editor phase 40, and/or product formation/processing phase 60. For example, the vision system module 145 may detect any defects or issues with the various components of the manufacturing process 10 (e.g., the printer, reel editor, or other component). Additionally, the vision system module 145 may communicate potential issues in real time to the controller 90 to adjust operation to address any issues. By detecting and communicating such issues, the controller 90 may adapt operation to avoid unnecessary waste. Along these lines, in some embodiments, the controller 90 may work with the various modules of the platform 100 to switch production, such as to a different portion of a reel map to avoid down time. In this regard, the vision system module 145 provides for the ability for on-the-fly adjustments during the manufacturing process.

In some embodiments, the vision system module 145 may be configured to detect various markers as the roll of web product progress through various components (e.g., through the printer, reel editor, a corrugator, etc.). Based on the detected markers, the vision system module 145 may provide information to the controller 90 for operation/control accordingly. Further, such information can be used for tracking orders and status.

In some embodiments, photographs (e.g., digital images) can be taken and stored for evidence or additional learning. In some embodiments, the photographs could be automatically provided to the customer for verification and auditing purposes.

In some embodiments, the vision system module 145 is configured to update the graphics file management module 120 to store and/or access golden reference images for print quality comparison.

The vision system module 145 may be configured to communicate, for example, with the press module 140, the customer insights module 152, the reel manifest module 150, and/or the ERP/corrugator planning module 165.

The customer insights module 152 may be configured to determine insights that may be useful for obtaining efficiencies, such as for a customer. The insights may be related to, for example, trends for customers, trends that the customer may find desirable, suggestions for the customer for future orders, etc. Additionally or alternatively, the insights may be related to achieving efficiencies for preparing product for specific customers. For example, the customer may indicate that certain "defects" are not important or not really defects as recognized by the vision system module 145.

In some embodiments, the customer insights module 152 may track and utilize non-customer specific information, such as for determining general efficiencies of process. For example, the module may track variable data/marker usage, reel map trends and usages, printer data, print head usage, paper waste, etc., such as to help form insights to increase efficient manufacturing processes.

The customer insights module 152 may be configured to communicate with, for example, the variable data engine 135, the vision system module 145, and/or the reel manifest module 150.

The reel manifest module 150 may be configured to store and/or track the process flow (e.g., reel map) for the manufacturing process. The reel manifest module 150 works with the imposition engine module 130 to store the job layouts for operation during the manufacturing process 10. The reel manifest 150 may be checked, such as by the controller 90, to help determine the current position on a reel map—such as in response to receiving a detection (e.g., a marker or a defect) from the vision system module 145. Further, the corresponding information needed to operate the corrugator according to the reel map may be stored at the reel manifest module 150 and provided to the controller 90 so that the controller 90 may operate the corrugator accordingly. The reel manifest module 150 may work with the reel editor module 155 to edit the reel map in real time, such as described herein. The reel manifest module 150 may be configured to communicate with, for example, the customer insights module 152, the imposition engine module 130, the press module 140, the vision system module 145, the corrugator controls module 160, and/or the reel editor module 155.

The reel editor module 155 may be configured to enable editing of the process flow, such as the reel map. In this regard, in some embodiments, the reel editor module 155 interacts with the reel manifest module 150 to update the stored reel map. In some embodiments, the reel editor module 155 may work with the vision system module 145 to identify unnecessary waste, which can be edited from the reel map, such as based on instructions for the controller 90. Such example information can also be provided to the ERP/corrugator planning module 165 to update the reel map and/or for consideration in future jobs. The reel editor module 155 may be configured to communicate, for example, with the reel manifest module 150, the vision system module 145, and the ERP/corrugator planning module 165.

The corrugator controls module 160 may be configured to control operation of the corrugator, such as described herein.

In some embodiments, the corrugator controls module 160 may work with one or more cameras/detectors to detect information (e.g., markers or defects) that can be used to control/adjust operation of the corrugator. For example, the cameras/detectors may detect a marker and the corrugator controls module 160 may determine how to operate the corrugator based on the detected marker (and/or the corresponding position of the reel map). Then, based on the determined desired operations, the corrugator controls module 160 may cause operation of the corrugator. For example, the corrugator controls module 160 may cause one or more knives to change position and/or perform a cut. Additional information regarding contemplated control through detection of markers is provided in greater detail herein. The corrugator controls module 160 may be configured to communicate with, for example, the reel manifest module 150, the vision system module 145, and the ERP/corrugator planning module 165.

In some embodiments, other components/machines and their corresponding controls may replace the corrugator, such as components/machines geared toward manufacturing of other products.

Example Structures and Orders for a Roll of Web Product

Figure 3A:
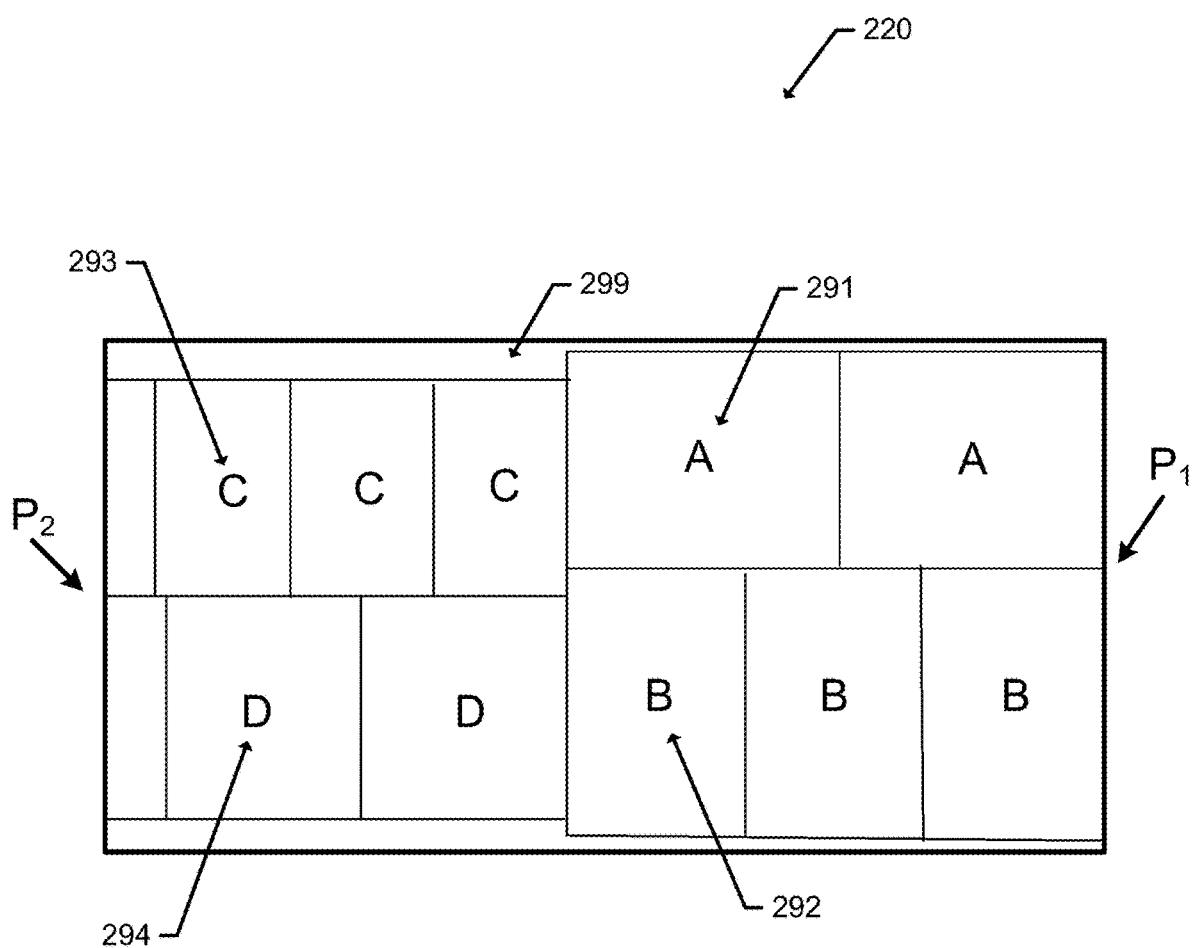
FIG. 3A shows an example portion of a roll of web product with four different structure areas, in accordance with some example embodiments discussed herein.

FIG. 3A shows an example arrangement of structures A, B, C, and D on a roll of web product 220, such as after the printing phase 30, and may, in some embodiments, form a representation of a control plan. Prior to printing, however, the roll of web product is blank such that there is no information thereon. In this regard, the controller 90 operates the various components of the printing phase 30 to form printed images and/or markers on the blank roll of web product to begin forming the desired structures. In the depicted example of FIG. 3A, the portion of the roll of web product 220 includes a number of first structures (A, 291), a number of second structures (B, 292), a number of third structures (C, 293), and a number of fourth structures (D, 294). The roll of web product 220 also includes some unused (scrap) sections 299 and potentially some waste between order changes down web, such as between structures A/B and structures C/D (though not shown in the example of FIG. 3A).

In some embodiments, the present invention contemplates use of a readable marker to enable efficient control and/or operation of various components of the manufacturing process 10. The present invention, in some embodiments, contemplates utilizing one or more markers on the roll of web product that is printed on the press and "read" to enable control of the various components of the manufacturing process 10. By "reading" the marker, the controller 90 can determine how to operate—such as by referring to a control plan associated with the roll of printed web product and determining the position along the control plan by virtue of the read marker. The marker can also be used in tracking the boxes for positioning in proper stacks and/or determining completion status of an order. The present invention contemplates many different types of markers (e.g., QR codes, bar codes, color marks, instructions themselves, etc.).

Figure 3B:
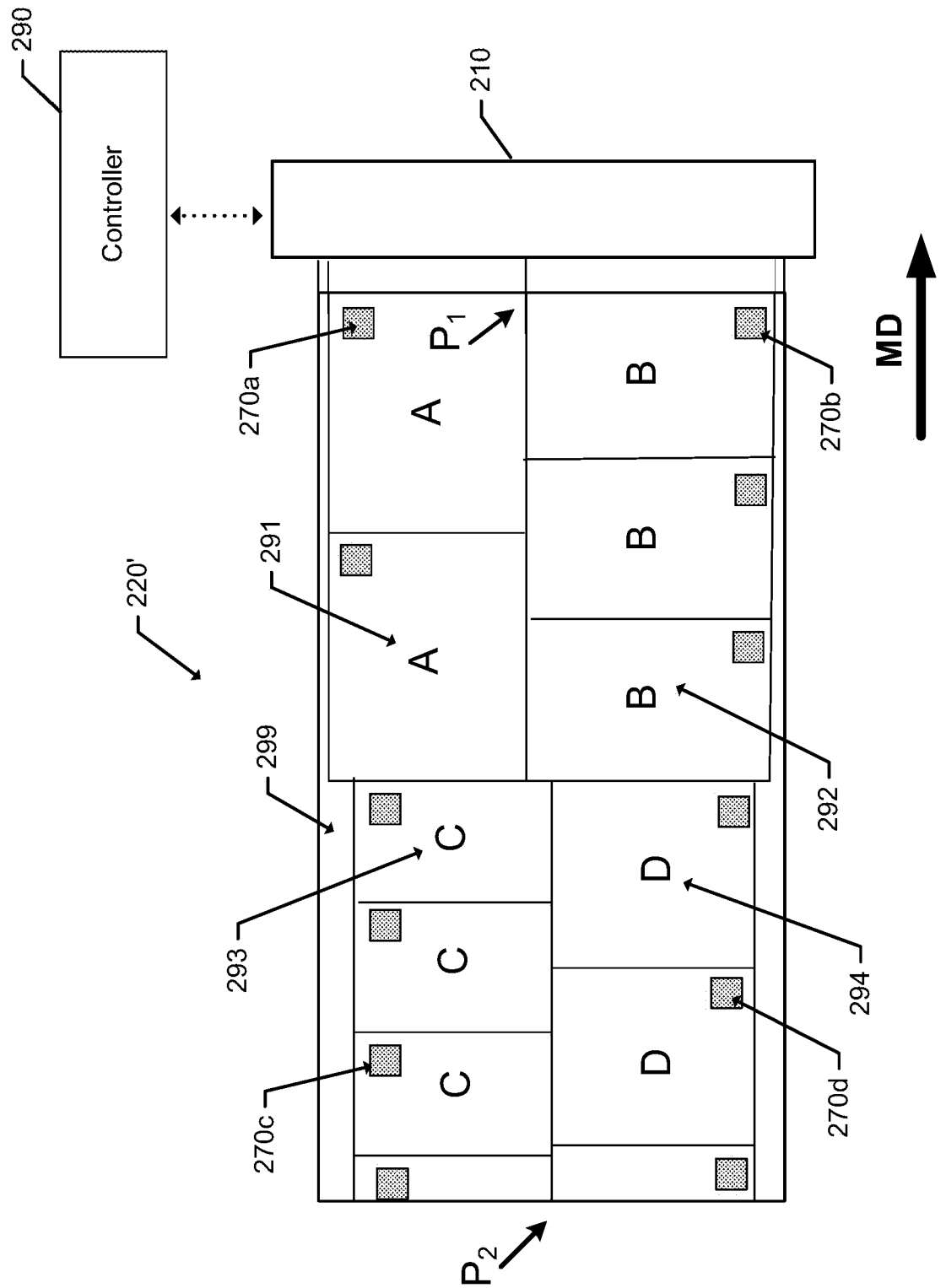
FIG. 3B shows an example portion of a roll of web product, wherein the structure areas each include a readable marker, in accordance with example embodiments described herein.

FIG. 3B illustrates an example portion of a roll of web product 220' that includes readable markers 270*a-d*. Notably, each structure includes a different readable marker. For example, structure A, 291 has a corresponding readable marker 270*a*; structure B, 292 has a corresponding readable marker 270*b*; structure C, 293 has a corresponding readable marker 270*c*; and structure D, 294 has a corresponding readable marker 270d. Though the depicted embodiment shows the readable marker positioned within a sheet or box structure, in some embodiments, the readable marker may be positioned in the margins or other waste area, but still associated with the corresponding structure (or order section with the one or more structures).

One or more detectors 210 may be positioned along the pathway through the various components operating for the roll of web product (e.g., a printer, a reel editor, a corrugator, finishing, etc.). In this regard, the one or more detectors 210 may be configured to "read" or detect the marker and provide that information to the controller 290 (e.g., controller 90). The controller 290 may then be configured to automatically control the various components of the manufacturing process 10 accordingly.

Depending on the desired configuration, some embodiments of the present invention contemplate different methods for obtaining information from the readable marker. For example, the readable marker may be a QR code and cause automatic gathering of instructions for how the corrugator should operate based on following a link or other redirection method provided by the QR code. Similarly, other readable markers may cause the controller 290 to use a look-up table or other correlation means to determine how to operate the corrugator. In some embodiments, the marker may include instructions in the marker itself. For example, position coordinates corresponding to a desired position for one or more knives of a corrugator may form part of the marker. In such embodiments, there is no need for a look-up table.

Example Corrugated Box Manufacturing Process

Corrugated sheet and box manufacturing is an example paper, sheet, and/or box manufacturing system. In some such manufacturing, a corrugator is used to glue together layers of board web with a flute medium positioned in between. Depending on the desired characteristics of the corrugate board web, different layers/arrangements can be combined. Once formed, the corrugate board web (e.g., top layer, flute medium, and bottom layer) may then be cut into appropriate sheet or box structures, and later scored, cut, glued etc. to form the broken down box (that is then folded and manipulated to form the box, such as by the customer). Although the following description provides detailed examples of "corrugators", some example embodiments of the present invention contemplate the term "corrugator" to mean a board-making device, such as a high speed laminator.

FIG. 4A illustrates an example corrugated box manufacturing process 510 according to various embodiments of the present invention. The manufacturing process 510 includes a number of phases that result in a finished corrugated sheet or box that is shaped and printed per the customer's order. The process 510 may include an ordering phase 512, a planning phase 514, a print phase 530, a reel editor phase 540, a board making/cutting phase 560 (e.g., a sheet formation/processing phase), a finishing phase 570, and a tracking/logistics phase 580. In some embodiments, less or more phases or different orders of phases are contemplated. Additionally, while the described example is detailed for corrugated box making, some embodiments of the present invention are contemplated for extension into other product manufacturing, including printed paper-based product manufacturing, such as folded carton, beverage labels, flexible paper, industrial bags, plates, cups, décor, and many others.

In the ordering phase 512, a customer may supply an order that includes desired characteristics for the end product. For example, the customer may provide a number of desired sheet or box structures, sheet or box shape requirements, one or more images/designs for printing on the sheet or box, color specifications, among many others. In some embodiments, the customer 512 may input such an order through a web interface. The web interface may enable the customer 512 to easily input the desired characteristics of the order electronically. The web interface may also enable the customer to perform many related tasks, including, for example, updating orders, tracking orders, handling payment, requesting assistance, setting up automated ordering (e.g., recurring ordering), viewing and approving example images ("soft proofing"), viewing example end products, etc.

In addition to providing increased efficiency of process for the customer, the web interface may also directly interact with and provide information for automated processes useful in the remainder of the manufacturing process 510. For example, the information from the web interface may be fed directly into a corrugator plan controller (such as the controller 590) and utilized accordingly. For example, as described herein, the information from the web interface may be used to form a corrugator plan and/or associated reel map or print plan of the corrugated sheet or box structure making process. Additionally, however, the information from the web interface may be used to provide on-the-fly updates or adjustments to the manufacturing process. Further, feedback (e.g., from the controller 590) may be provided back to the web interface for the customer, such as tracking information, images of the completed sheet or box structures, among other things.

In some embodiments, a controller 590 may be configured to perform various functionality useful in the manufacturing process 510 (e.g., the various modules/phases described herein). For example, the controller 590 (such as during the planning phase 514) may be configured to form a corrugator plan (which may be included in an associated reel map), such as may be used in conjunction with the corrugator 550 (e.g., during the board making phase/cutting phase 560). As used herein, in some embodiments, an associated reel map may be an example of a corrugator plan. In this regard, other example corrugator plans (e.g., a print plan) can be used, formed, etc. Additionally or alternatively, the controller 590 may be configured to form a print plan that is used in the printing phase 530 (such as described herein). Likewise, the controller 590 may be used with the ordering phase 512, such as to receive order information, the finishing phase 570, and/or the tracking/logistics phase 580. An example controller 590 is described further herein as controller 690 (which is shown and described with respect to FIGS. 5A and 5B). In some embodiments, the controller 590 may be spread over any number of controllers at any of the various phases of the manufacturing process 510.

In some embodiments, sections of the process flow can be shifted from plant to plant or device to device due to various external circumstances. For example, repair of certain parts of the corrugator, replacing certain printer inks, etc., may cause only certain customer sheet or box structures to be able to be manufactured. In this regard, in some embodiments, certain portions of the process flow may be shifted, such as being jumped in line, moved to another facility, etc., in order to maintain efficient up time of operation of the printer(s) and corrugator(s).

Figure 5A:
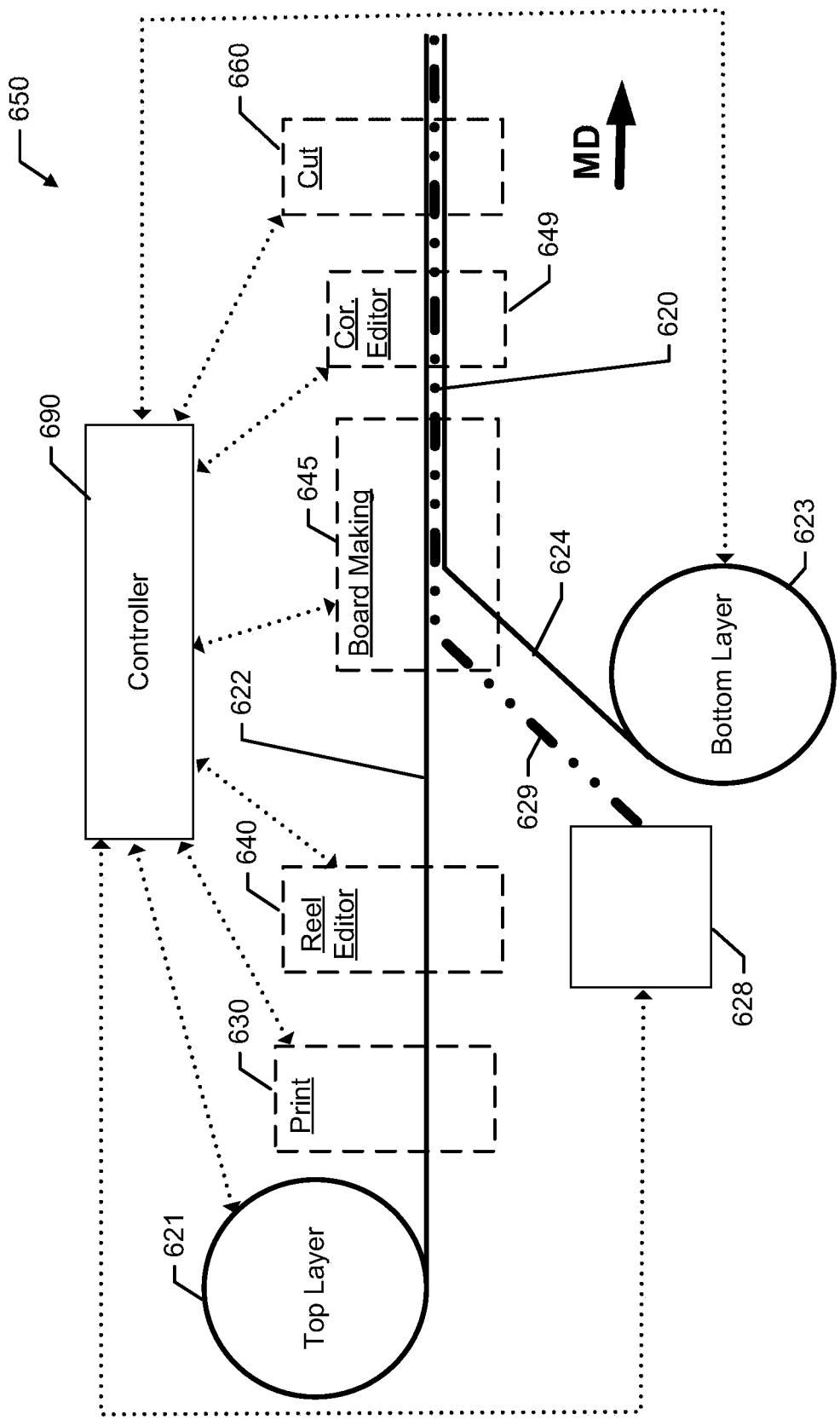
FIG. 5A illustrates a portion of the corrugated box manufacturing process with print in-line with the corrugator, in accordance with some embodiments discussed herein.
Figure 5B:
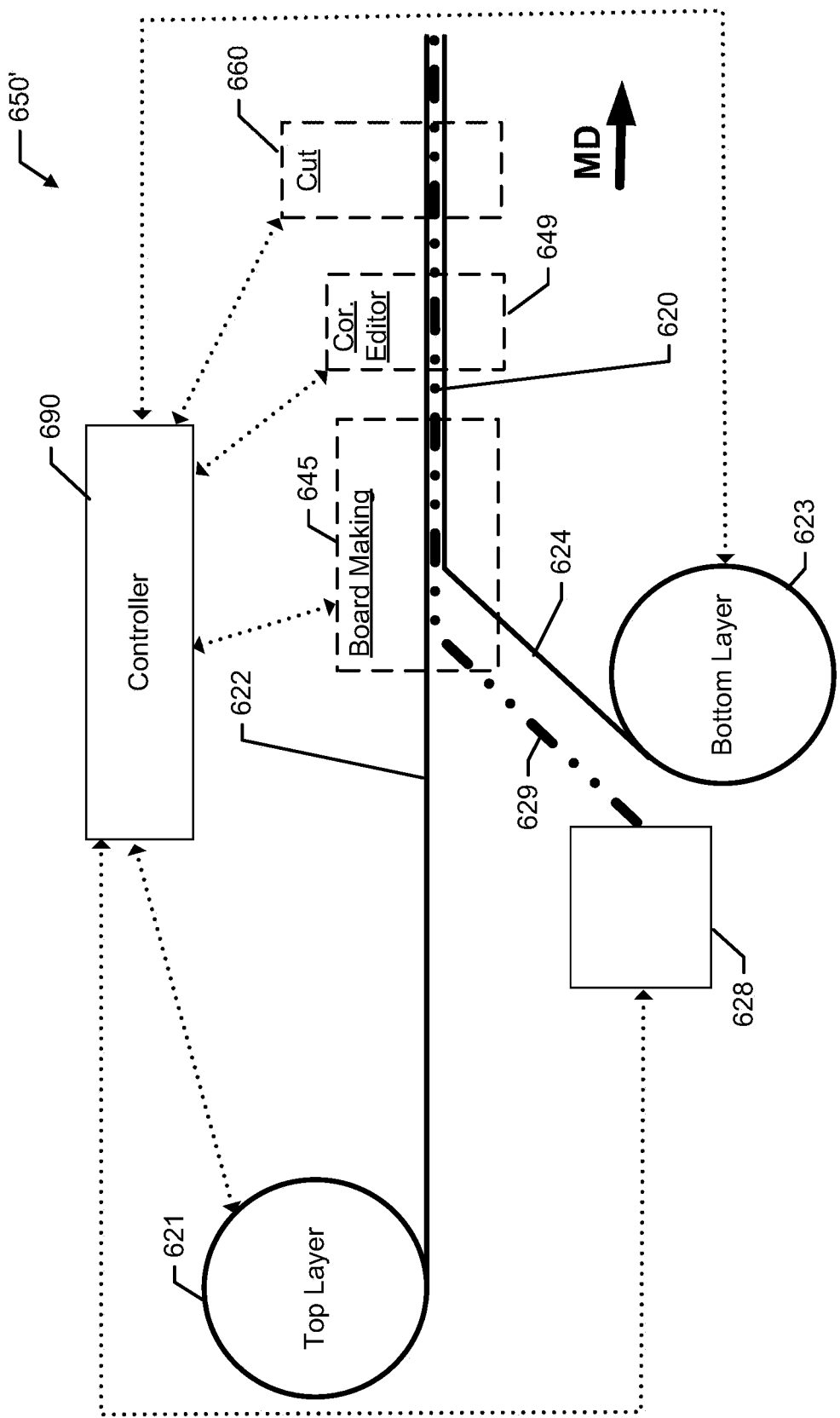
FIG. 5B illustrates a portion of the corrugated box manufacturing process with print off-line or near-line, before the corrugator, in accordance with some embodiments discussed herein.

The manufacturing process 510 may also include the printing phase 530, reel editor phase 540, and board making/ cutting phase 560. In some embodiments, the printing phase 530, reel editor phase 540, and board making/cutting phase 560 may be performed using a corrugator 550 (such as shown in FIG. 4A) or other manufacturing system. Alternatively, in some embodiments the printing phase 530 and/or reel editor phase 540 may be performed separately, prior to the corrugator 550' (such as shown in the manufacturing process 510' shown in FIG. 4B). Similarly, FIG. 4A also illustrates that the real editor phase 540 may be optional within a corrugator 550 that also employs a printing phase 530. FIG. 5A illustrates an example corrugator 650 that incorporates the printing phase 530, the reel editor phase 540, and the board making/cutting phase 560 to form an in-line process. In some embodiments, the reel editor phase 640 may not be included in the example corrugator 650 of FIG. 5A. FIG. 5B illustrates an example corrugator 650' with the printing phase 530 and the reel editor phase 540 occurring separately, prior to the board making/cutting phase 560. This approach is sometimes referred to as a near-line process.

With reference to FIG. 5A, the corrugator 650 may, such as through controller 690, cause conveyance of one or more paper web, printed web, corrugated board web, and/or flute medium through the machine (and various phases), such as along the machine direction (MD) arrow. For example, one or more conveyor means (e.g., a conveyor belt) and/or motors may be used to cause a top layer 622 of paper web to pass through a printing phase 630 and, optionally, a reel editor phase 640. The top layer 622 of paper web may be held in a roll 621 (or other form), such as may be referred to herein as a roll of web product. The corrugator 650 may also control introduction of one or more flute mediums 629 and/or other layers to form the corrugated board web (such as the roll 623 of the bottom layer 624 of corrugated board web).

As described herein, in some embodiments, a reel map (e.g., a corrugator plan) may be used to help maintain efficient operation of the corrugator and avoid waste during making of the sheet or box structures. In this regard, a certain arrangement of sheet or box structures may need to be followed through the corrugator 650. Such operation and tracking may occur, such as through use of the controller 690.

As described in more detail herein, the controller 690 provides logic and control functionality used during operation of the corrugator 650 and, in some embodiments, the entire manufacturing process 510. In some embodiments, the functionality of the controller 690 may be distributed to several controllers that each provides more limited functionality to discrete portions of the operation of manufacturing process 510. In this regard, the controller 690 may have the same or similar suitable hardware or software to the controller 90 described herein.

The controller 690 may be operably coupled with one or more components of the manufacturing process 510, including for example, the roll 621 of the top layer 622 of corrugated board web, a medium holder (e.g., roll) 628 of medium 629, the roll 623 of the bottom layer 624 of corrugated board web, various components of the printing phase 630, various components of the reel editor phase 640, various components of the boarding making phase 645, various components of the cutting phase 660, conveyance means of the corrugator, various components of phases for the manufacturing process, and other components (such as described herein). For example, depending on the components, the controller 690 may be operably coupled such as through use of solid-core wiring, twisted pair wiring, coaxial cable, fiber optic cable, mechanical, wireless, radio, infrared, etc. In this regard, depending on the components, the operable coupling may be through one or more intermediate controllers or mechanical coupling, such as used for controlling some components (e.g., controlling operation and/or feeding of the roll 621 of the corrugated board web). In some embodiments, the controller 690 may be configured to provide one or more operating signals to these components and to receive data from these components.

As noted above, the controller 690 (e.g., the corrugator plan controller) may be split into more than one controller, such as multiple controllers that exchange information, data, instructions, etc. For example, the controller 690 may be split into a corrugator planning software controller, a corrugator machine user interface controller, a corrugator system controls, press 630 operations and graphics workflow software and/or specific functional controls (e.g., a separate vision system such as described herein).

In some embodiments, such as described in greater detail herein, the controller 690 may be operably coupled to one or more vision systems, such as for detecting markers and/or defects/errors during the manufacturing process. Depending on the feedback from the vision systems, the controller 690 may control the corrugator 650 and/or manufacturing process 510 accordingly.

Depending on the configuration of the corrugator, the printing phase 630 may occur prior to combining the layers of corrugated board web 621, 623 and flute medium 628 (e.g., "pre-print") or after combining two or more layers (e.g., "post-print"). In some embodiments, printing may occur to other layers (e.g., the bottom layer 623), such as in alternative to or in addition to the top layer 621.

During the printing phase 630, the controller 690 may direct the press digital front end (DFE) and raster image processor (RIP), etc., to print one or more images at specific locations on the top layer 622 of the paper web. Depending on the configuration of the corrugator 650 and/or manufacturing process 510, the controller 690 may utilize a process flow (e.g., reel map) to determine where on the paper web to print the images and/or markers. For example, an image selected by the customer (such as a bottle), may be printed in the center (or other section) of a sheet or box structure—such as may ultimately be visible for marketing or other purposes once the box is formed. Any image (including, words, markers, instructions, etc.) are contemplated by various embodiments of the present invention. Example markers that can be printed, include any marker that may be used by various components of the manufacturing process 510, such as for tracking, cutting, printing, etc. Further description regarding possible markers and their utilization is provided in greater detail herein. In this regard, the controller 690 may be connected to one or more vision systems that are used to read or detect color, defects, and various markers for controlling and/or updating operation of the corrugator 650.

During the reel editor phase 640, the controller 690 may be configured to perform functions described herein related to editing or determining whether to edit the printed top layer of board web. Although shown in-line, in some example embodiments, the reel editor 640 may be out of line or near-line such that the roll of web product may be transferred to the reel editor 640 for processing. In some embodiments, the corrugator may have one or more functions/features that enable editing of the roll of web product (such as removing waste). In some such example embodiments, the reel editor 640 may form part of the corrugator.

During the board making phase 645, the controller 690 may be configured to cause combining of one or more layers and/or flute medium to form the corrugated board web for the boxes. For example, the controller 690 may be configured to cause fluted medium 629 to be fed into contact with one or more layers of corrugated board web, such as between a top layer 622 (such as from the roll 621) and a bottom layer 624 (such as from the roll 623). In this regard, in some embodiments, the fluted medium 629 may be fed into contact with the top layer 622 prior to the combined fluted medium 629 and top layer 622 coming into contact with the bottom layer 624. The controller 690 may cause formation of the combined layers into a layered corrugated board web 620, such as through use of glue or other adhesive.

During a corrugator editing phase 649, the controller 690 may be configured to edit the corrugated board web, such as by chopping out waste or undesirable corrugated board web. Such waste can be removed from the corrugator 650.

During the cutting phase 660, the controller 690 may be configured to cut out the sheet or box structures. In this regard, the controller 690 may be operably coupled to the various knives to control operation during the cutting phase 660. In some embodiments, the controller 690 may be configured to utilize the process flow (e.g., reel map) to determine how to operate the various knives (e.g., move the knives, cause a cut to occur, etc.).

Figure 6:
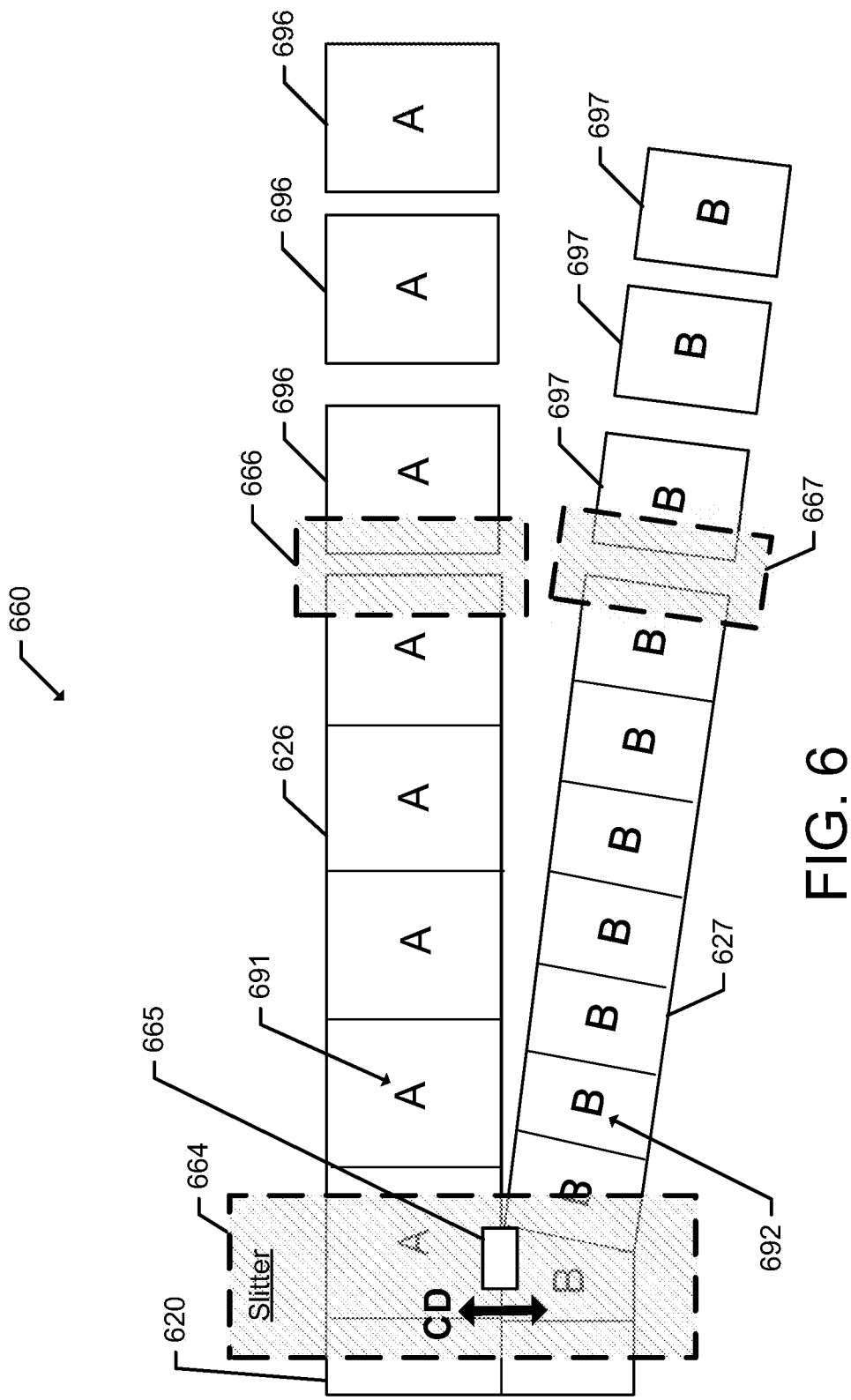
FIG. 6 illustrates a cutting arrangement portion of the corrugated box manufacturing process, in accordance with some embodiments discussed herein.

FIG. 6 shows an example cutting phase 660 that includes a knife (e.g., slitter 664) that is configured to cut the layered corrugated board web 620 in the longitudinal (or machine) direction. The cutting phase 660 also includes two knives 666, 667 that are each configured to cut the layered corrugated board web 620 in the lateral direction or cross direction CD. As described herein, the controller 690 may be operably coupled to the various knives to control operation thereof. In some embodiments, the controller 690 may be configured to utilize the process flow (e.g., reel map) to determine how to operate the various knives (e.g., move the knives, cause a cut to occur, etc.).

As the layered corrugated board web 620 passes through the cutting phase, a slitter 664 may be configured to split the layered corrugated board web 620 to cause it to split into different sections that travel on different paths (such as the top section 626 that travels along the top path and the bottom section 627 that travels along the bottom path). In some embodiments, a first sheet or box structure may form the top section 626 and a second sheet or box structure may form the bottom section 627—thereby creating two different paths that separate the two types of sheet or box structures (e.g., sheet or box structure A, 691 is formed in the top section 626 and sheet or box structure B, 692 is formed in the bottom section 627). The location 665 in which the slitter 664 performs the cut is important because sheet or box structures may vary as the layered corrugated board web 620 travels through the corrugator. For example, FIG. 3A shows that a slitter would need to cut at a first position $P_1$ to cause separation of the sheet or box structures A, 691 from the sheet or box structures B, 692. However, the slitter would need move at the right time (e.g., the transition from the sheet or box structures A, B to the sheet or box structures C, D) or a second slitter may be used to cut instead at the second position $P_2$ to cause separation of the sheet or box structures C, 693 from the sheet or box structures D, 694. Referring back to FIG. 8, the slitter 664 may be movable (such as based on instruction from the controller 690) in the cross direction CD in order to cut the layered corrugated board web 620 at the proper position.

Once separated into different paths, the various sections of layered corrugated board web 626, 627 may pass through respective knives 666, 667. In some embodiments, the knives 666, 667 may be configured (such as based on instruction from the controller 690) to cut the sheet or box structures in the lateral (cross) direction in order to form the desired sheet or box structures. For example, knife 666 cut the top section 626 to form the sheet or box structures A, 696. Likewise, knife 667 cut the bottom section 627 to form the sheet or box structures B, 697.

In some embodiments, other knives may be utilized for cuts, such as side slitters for cutting scrap along the edges. Likewise, other components may be utilized, such as scorers for pre-creasing sheet or box structures. Such other knives and/or components may be formed as part of the above described systems.

Referring back to FIG. 4A, with the sheet or box structures cut, the manufacturing process 510 may continue to the finishing phase 570. The finishing phase 570 may include additional printing, additional cutting, additional gluing, and/or other necessary functions to achieve a finished sheet or box structure for sending to the customer. In some embodiments, a vision system or other visual inspection system may be used to confirm accuracy of the order.

The manufacturing process 510 may also include a tracking/logistics phase 580 that includes tracking the finished sheet or box structures and preparing/delivering them to the customer. In some embodiments, one or more tracking or counting systems can be implemented upstream in the manufacturing process 510, such as to enable tracking/logistic planning (including separating orders) throughout the manufacturing process 510.

Example Color Marking System

In some embodiments, the present invention contemplates using a color marking system to enable automated efficient control of various manufacturing systems, such as a corrugator. Though the following description focuses on control of a corrugator, some embodiments of the present invention contemplate using the proposed color marking scheme (or aspects thereof) for automated control of any of the contemplated manufacturing systems.

In some embodiments, the color marking scheme may be employed instead of a readable marker. In addition to overcoming some of the prior manual checking shortcomings described above, the contemplated color markings also provide advantages over prior three line black-only cut-to-mark markers. In this regard, some corrugators detect such cut-to-mark markers and immediately initiate a cut. This approach, however, is limited—as all the cut markers look the same and, thus, the reel map has to be monitored closely and continually and manually checked to confirm that the right boxes were being cut/printed.

The present invention contemplates using a similar three line mark, but utilizing different colors to portray an upcoming "change" to the corrugator. In particular, a vision system reads the color of each marker. When a different color is recognized, then the controller knows to "check" the corrugator plan and/or associated reel map to determine how to operate. For example, the reel map may tell the corrugator that a different position of the knife is needed, different slitting is needed, new scoring is needed, etc. In some embodiments, the colors could be used to locate a position on the corrugator plan and/or associated reel map, making identification of where along the reel map the corrugator is easier. Further, such a system is simpler than using a readable marker, as it utilizes the already formed corrugator plan and/or associated reel map. In particular, it may simply trigger an automatic checking of the corrugator plan and/or associated reel map at the appropriate time (such as opposed to having to manually watch and manually check the reel map).

Figure 7:
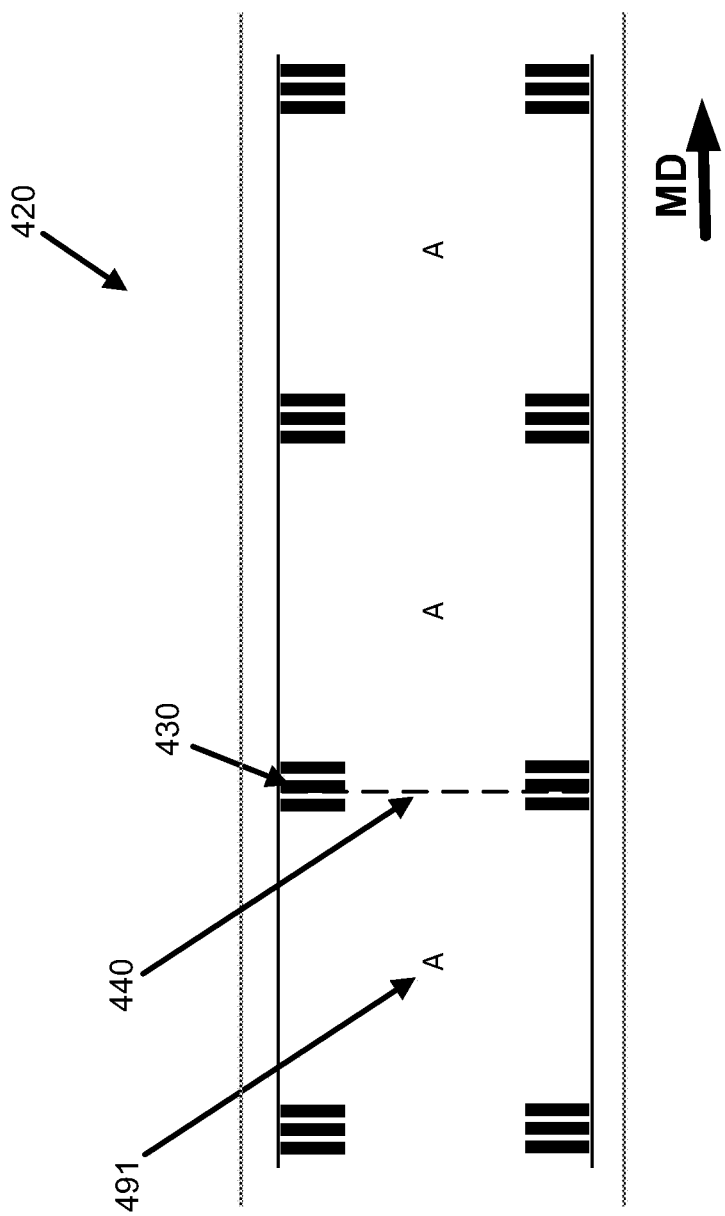
FIG. 7 illustrates a three line mark typically seen in corrugated sheet or box manufacturing of pre-printed liner, in accordance with some embodiments discussed herein.

Along these lines, another benefit of some embodiments of the proposed color marking system is the leveraging of traditional three-line cut-to-mark markers. FIG. 7 shows an example layered corrugate board web 420 that includes traditional three-line cut-to-mark markers 430. When the cut-to-mark markers 430 are detected, the knife will initiate a cut, such as along line 440 to separate the box or sheet structure 491. In the present invention, some embodiments utilize the three-line marker, but use a change in color to add the ability for the controller (e.g., controller 90) to detect a change and, thus, consult the corrugator plan and/or associated reel map for details regarding the anticipated change in operation.

Figure 8:
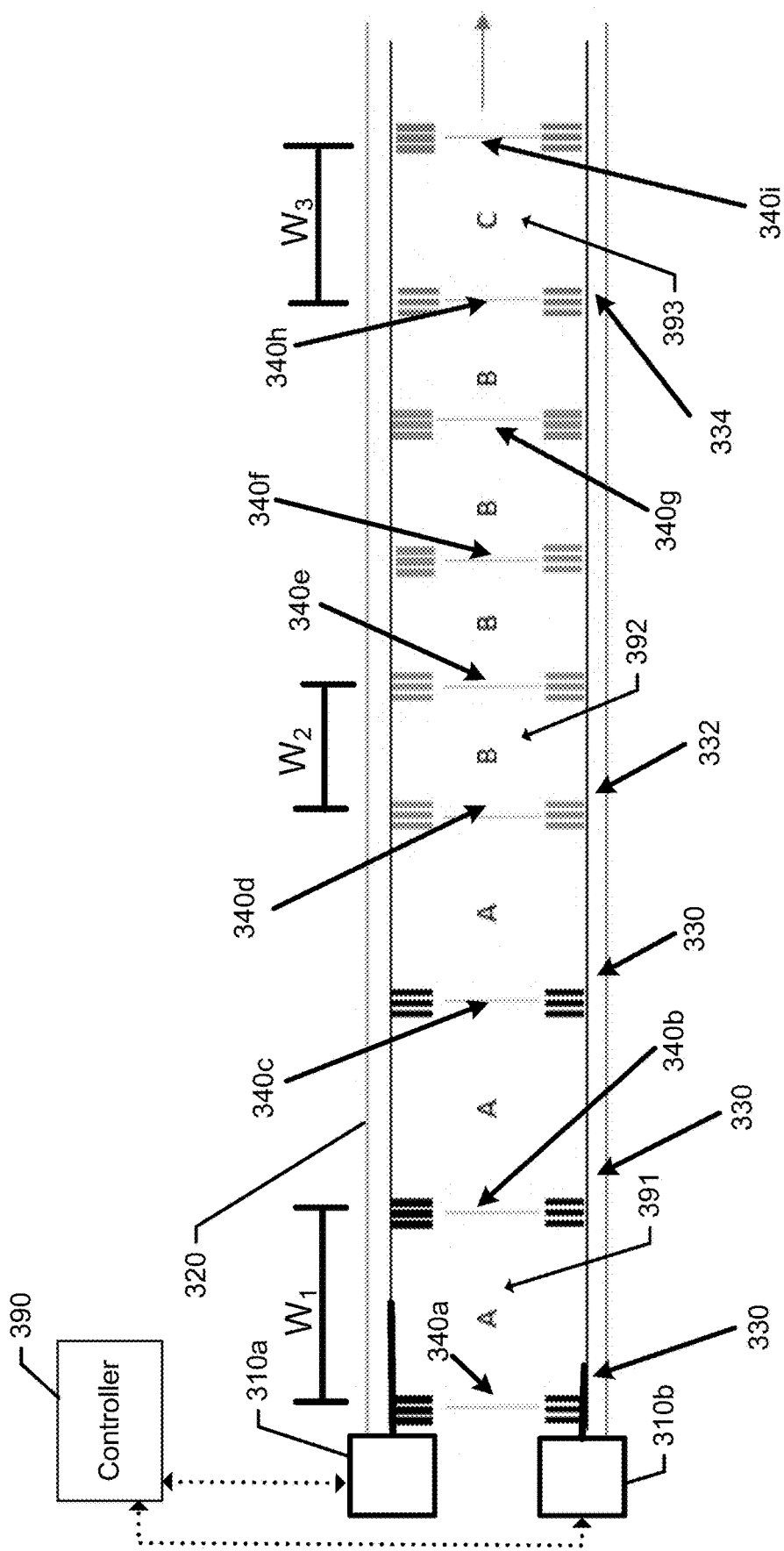
FIG. 8 shows an example portion of a layered corrugated board web, wherein the sheet or box structure areas of the board web each include a color marker, in accordance with example embodiments described herein.

FIG. 8 illustrates an example color marking system. In the depicted embodiment, a layered corrugate board web 320 includes three different sheet or box structures—sheet or box structure A, 391; sheet or box structure B, 392; and sheet or box structure C, 393. As the layered corrugated board web 320 passes along the machine direction (MD), one or more detectors (e.g., detectors 310*a*, 310*b*) detect a color marker and/or whether a color change has occurred.

For example, upon detecting color marker 330 (black), the detector 310*a* may inform the controller 390 which may, in response, cause a cut to occur (e.g., along line 340*a*). In some embodiments, knowing where along in the reel map the layered corrugate board web is, the controller 390 may know how to operate, such as anticipating an upcoming cut a distance $W_1$ away. In such an example embodiment, the controller 390 may wait to read the next color marker 330 and then initiate a cut in response thereto or the controller 390 may simply monitor the distance and initiate a cut once the distance $W_1$ has passed.

As the layered corrugated board web 320 continues to pass along the machine direction (MD), the corrugator continues to apply cuts at a distance W1 between each cut—causing cuts along 340*b*, 340*c*, and 340*d*. However, when the one or more of the detectors 310*a*, 310*b* detect a change in color, such as when detecting color marker 332 (teal), the controller 390 may, in response (e.g., be triggered to), check the reel map and determine how to operate. For example, the controller 390 may know that the new distance between cuts is $W_2$. This would result in cuts along lines 340*e*, 340*f*, 340*g*, and 340*h*—until another change in color was detected by detecting color marker 334 (magenta). In response, the reel map could be checked and it could be determined that a new distance between cuts is $W_3$.

In the above example, the determination of when a color change occurs triggers automatic checking of the corrugator plan and/or associated reel map, which then informs the controller 390 how to operate the corrugator. In this regard, the checking of the corrugator plan and/or associated reel map is automated (instead of manual) and performed only when needed—e.g., when a change to a new sheet or box structure occurs.

In some embodiments, the color information of the detected color marker is provided by the one or more detectors to the controller 390. In such examples, the controller 390 may be configured to compare the detected color to a prior color to determine if a sufficient degree of color change has occurred in order to trigger looking up the corrugator plan and/or associated reel map. For example, the amount of change in color may be compared to a color change threshold to see if a sufficient amount of color has changed.

In some embodiments, the colors are designed to be formed from digital print standards for 4 color Cyan/Magenta/Yellow/Black (CMYK) and extended gamut Orange/Violet/Green (OVG) plus custom colors as desired and uniquely recognizable by detection technology. Such example embodiments may advantageously limit ink utilization and simplify printability. In some embodiments, RGB print standard approach could be used. In some embodiments, the color of the substrate being used may be accounted for. For example, yellow and orange and/or light to brown colors could be skipped on white top or brown kraft paper products.

Though the depicted embodiment shows the color marker positioned within a sheet or box structure, in some embodiments, the color marker may be positioned in the margins or other waste area, but still associated with the corresponding sheet or box structure.

Figure 9:
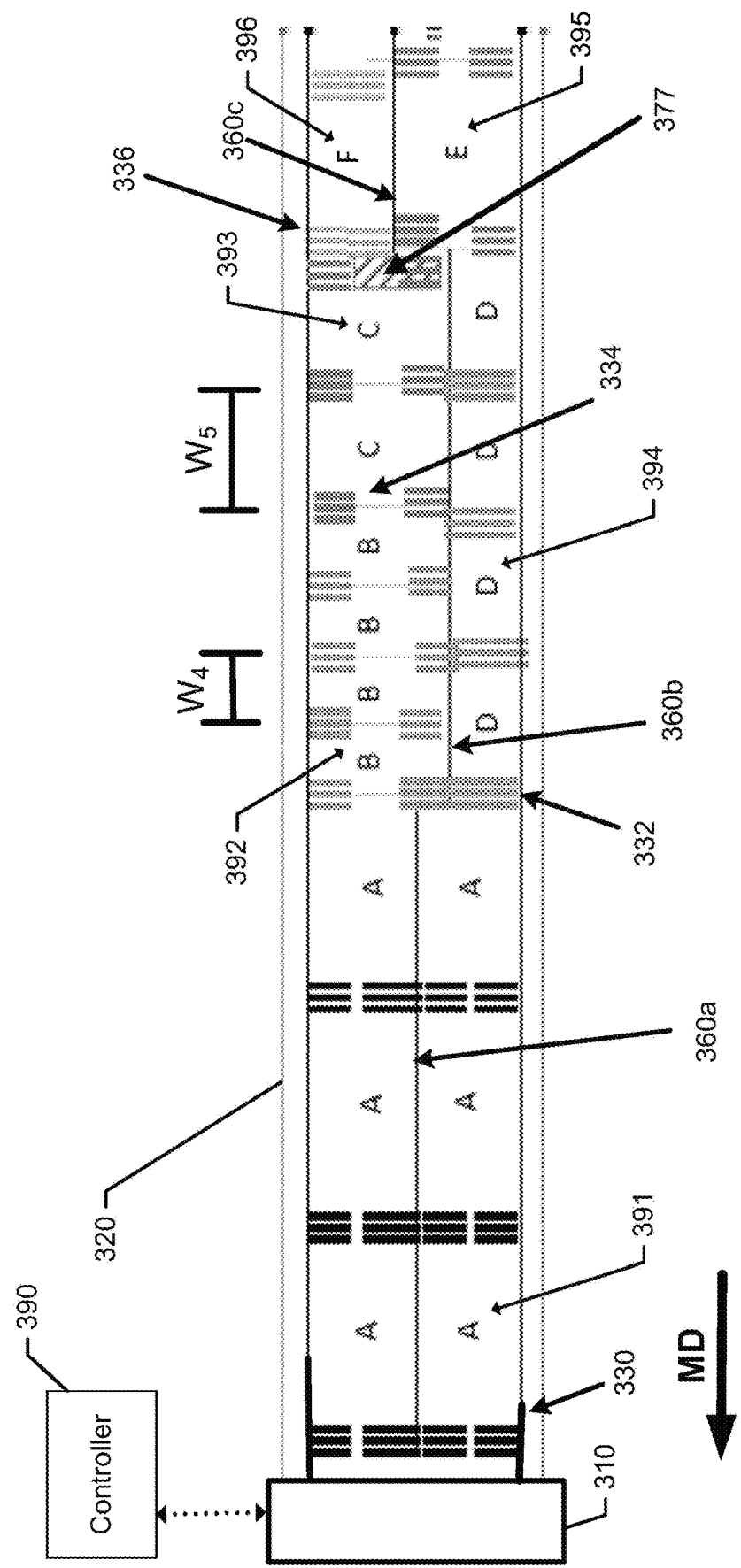
FIG. 9 shows another example portion of a layered corrugated board web, wherein the sheet or box structure areas of the board web each include a color marker, in accordance with example embodiments described herein.

As detailed herein, some embodiments of the present invention contemplate various locations for detectors, such as for detecting the color of color markers. For example, FIG. 7 shows two separate detectors 310*a*, 310*b* positioned near each edge of the layered corrugated board web 320. In other embodiments, one or more detectors may cover any amount up to and including the entire cross direction of the layered corrugated board web. For example, FIG. 9 shows such an example detector 310. With such an example detector 310, the detector 310 is able to detect a color marker that is at any point along the cross direction.

FIG. 9 illustrates an example system that uses detected change in color to determine where to position the slitter to transition between different sheet or box structures in a side-by-side running of sheet or box structures. For example, the controller 390 may be operating with the slitter at a position to initiate a longitudinal (machine) direction cut along line 360*a* while reading color markers 330 (black). However, upon the detector 310 detecting the change in color to color marker 332 (cyan), the controller 390 may check the reel map and update the position of the slitter to initiate a cut along line 360*b*. Likewise, the controller 390 may change the position of the slitter to cut along line 360*c* after checking the reel map in response to detecting a change in color to the color marker 336 (green).

Notably, FIG. 9 also illustrates an example where the slitter position stays the same such that two sections of sheet or box structures are made (e.g., sheet or box structures B and D), but sheet or box structure B transitions to sheet or box structure C on the top section. In this regard, the detector detects a change in color when detecting color marker 334. In response, the reel map is checked and there is no change in operation to either the slitter or the knife for the bottom section (e.g., the bottom section is still sheet or box structure D). However, the knife for the top section changes when it initiates a cut from a distance between cuts of $W_4$ to a distance between cuts of $W_5$—thereby adjusting to sheet or box structure C.

Figure 10:
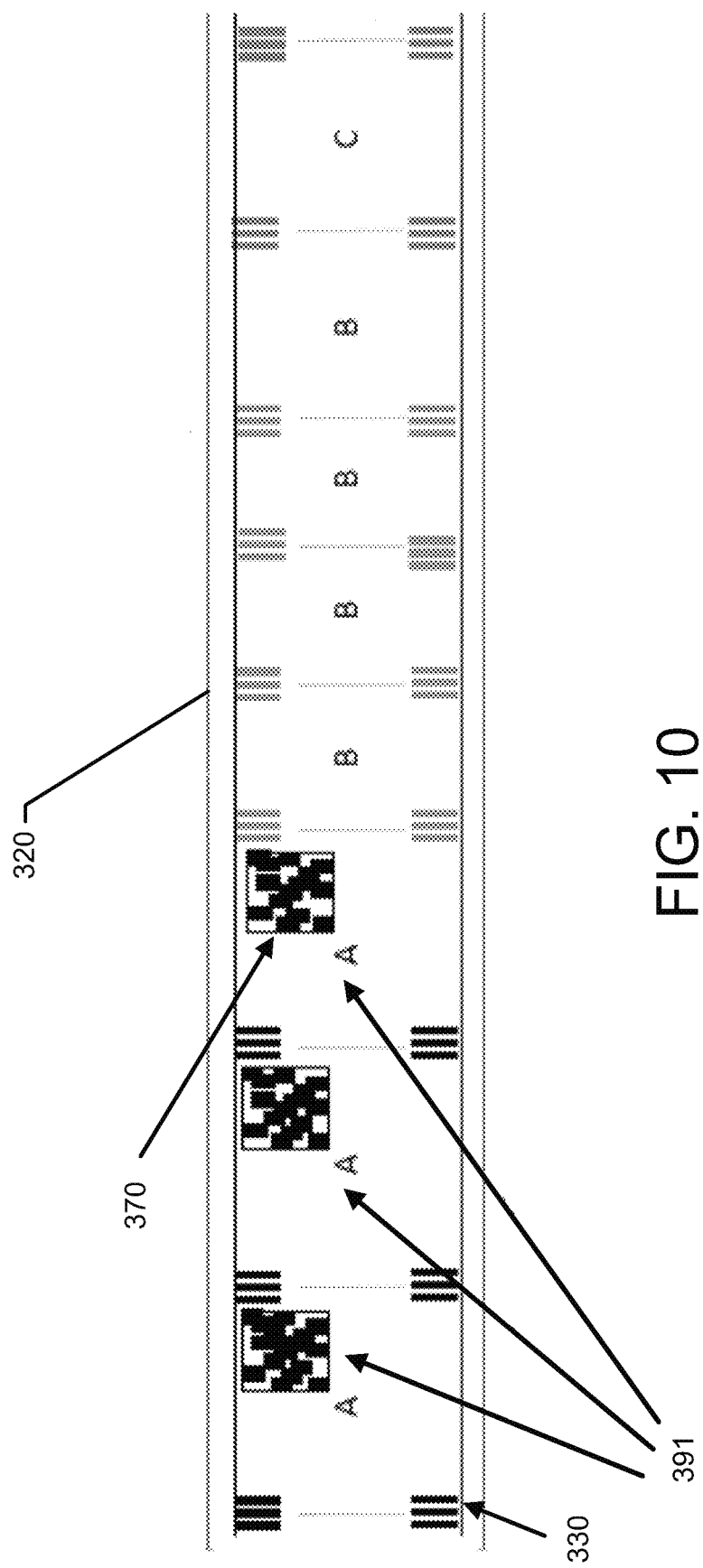
FIG. 10 shows yet another example portion of a layered corrugated board web, wherein the sheet or box structure areas of the board web each include a color marker, and wherein some of the sheet or box structure areas include a readable marker, in accordance with example embodiments described herein.

In some embodiments, readable markers may still be present on, at least, some of the sheet or box structures. Such readable markers (e.g., bar codes, QR codes, etc.) may, in some embodiments, be configured to enable tracking of the orders. Additionally or alternatively, the readable markers may supplement the color markers and enable some control of the corrugator upon being read and/or may be utilized for downstream processes after the corrugator (e.g., for tracking and other logistics). FIG. 10 illustrates an example layered corrugate board web 320 with sheet or box structures A, 391 that have color markers 330 and readable markers 370.

Example Other Product Manufacturing Processes

As noted herein, some embodiments contemplate systems for controlling manufacturing of various products, such as various paper-based products, including corrugated boxes, folded carton, labels, flexible paper, industrial bags, plates, cups, décor, and many others. FIGS. 11-14 illustrate block diagrams of various example other paper-based product manufacturing contemplated by various embodiments described herein. In this regard, some embodiments of the present invention contemplate one or more controllers (e.g., controller 90) that can generate and provide a control plan to various devices/systems for performing efficient manufacturing of such various products.

Figure 11:
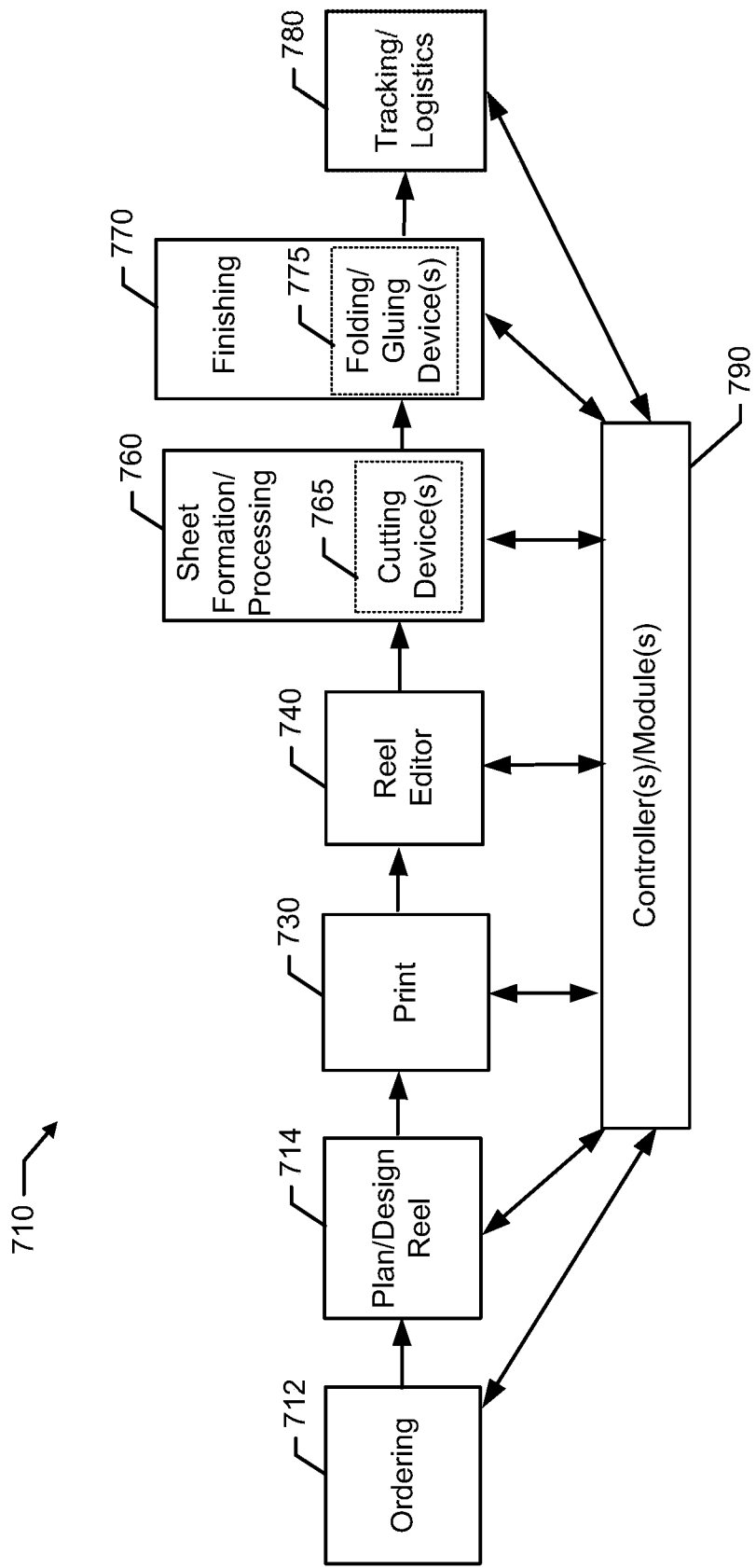
FIG. 11 shows a block diagram of an example folded carton manufacturing process, in accordance with some embodiments discussed herein.

FIG. 11 shows a block diagram of an example folded carton manufacturing process according to various embodiments of the present invention. The manufacturing process 710 includes a number of phases that result in a finished folded carton that is shaped, formed, and printed per the customer's order. The process 710 may include an ordering phase 712, a planning phase 714, a print phase 730, a reel editor phase 740, a sheet formation/processing phase 760, a finishing phase 770, and a tracking/logistics phase 780. Such phases may be similar to the phases described with respect to the manufacturing phase 10 of FIG. 1. In some embodiments, less or more phases or different orders of phases are contemplated. Depending on the desired configuration, one or more controller(s) 790 may be used to control one or more various phases (e.g., various systems/devices therein) of the manufacturing process 710. In some embodiments, one device/system may encompass multiple phases, such as two or more of the printing phase 730, the reel editor phase 740, the sheet formation/processing phase 760, and the finishing phase 770.

In some embodiments, like the manufacturing process 10 described with respect to FIG. 1, the example folded carton manufacturing process 710 may include one or more cutting devices 765 for cutting one or more sheets (or structures) from the roll of web product. Additionally, in some embodiments, a web forming device may form an updated web, such as prior to processing through the cutting device.

In some embodiments, the folded carton manufacturing process 710 may include one or more unique devices, such as a folding/gluing device 775 that may form part of the finishing phase 770 (or the sheet formation/processing phase 760). The folding/gluing device 775, such as using one or more folding arms or other hardware and/or various software, may be configured to perform one or more folds of various sheets to form the desired folded carton. In some embodiments, the folding device 775 may be configured to apply glue separately or in addition to performing the one or more folds.

Figure 12:
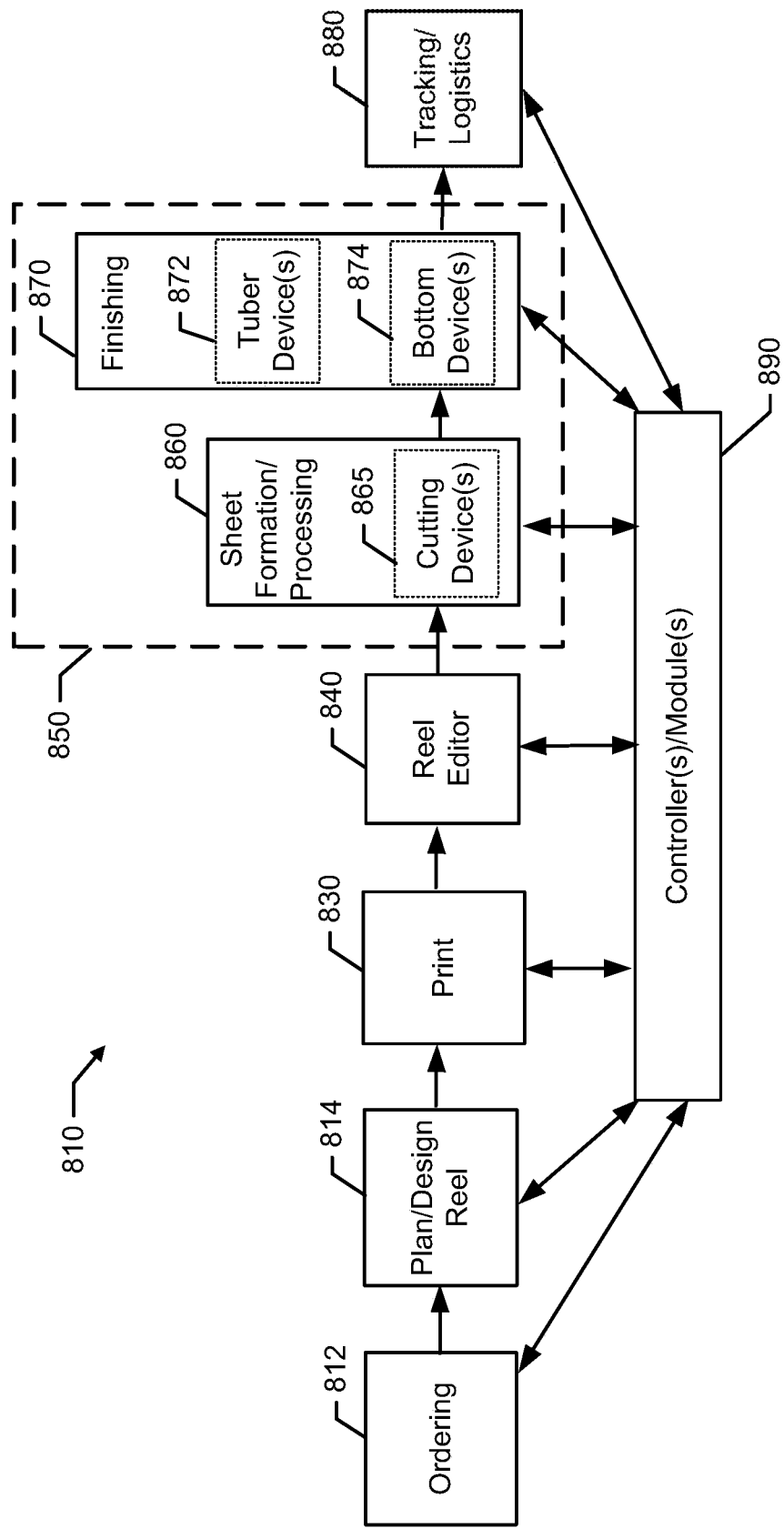
FIG. 12 shows a block diagram of an example industrial bag manufacturing process, in accordance with some embodiments discussed herein.

FIG. 12 shows a block diagram of an example industrial bag manufacturing process. The manufacturing process 810 includes a number of phases that result in a finished industrial bag that is shaped, formed, and printed per the customer's order. The process 810 may include an ordering phase 812, a planning phase 814, a print phase 830, a reel editor phase 840, a sheet formation/processing phase 860, a finishing phase 870, and a tracking/logistics phase 880. Such phases may be similar to the phases described with respect to the manufacturing phase 10 of FIG. 1. In some embodiments, less or more phases or different orders of phases are contemplated. Depending on the desired configuration, one or more controller(s) 890 may be used to control one or more various phases (e.g., various systems/devices therein) of the manufacturing process 810. In some embodiments, one device/system may encompass multiple phases, such as two or more of the printing phase 830, the reel editor phase 840, the sheet formation/processing phase 860, and the finishing phase 870. For example, an industrial bag manufacturing machine 850 may encompass both the sheet formation/processing phase 860 and the finishing phase 870.

In some embodiments, like the manufacturing process 10 described with respect to FIG. 1, the example industrial bag manufacturing process 810 may include one or more cutting devices 865 for cutting one or more sheets (or structures) from the roll of web product. Additionally, in some embodiments, a web forming device may form an updated web, such as prior to processing through the cutting device.

In some embodiments, the industrial bag manufacturing process 810 may include one or more unique devices, such as a tuber device 872 and/or bottom device 874 that may form part of the finishing phase 870 (or the sheet formation/processing phase 860). The tuber device 872, such as using various hardware and/or software, may be configured to form one or more sheets into one or more tubes. The bottom device 874, such as using various hardware and/or software, may be configured to form a bottom on each of the tubes to form the industrial bag.

Figure 13:
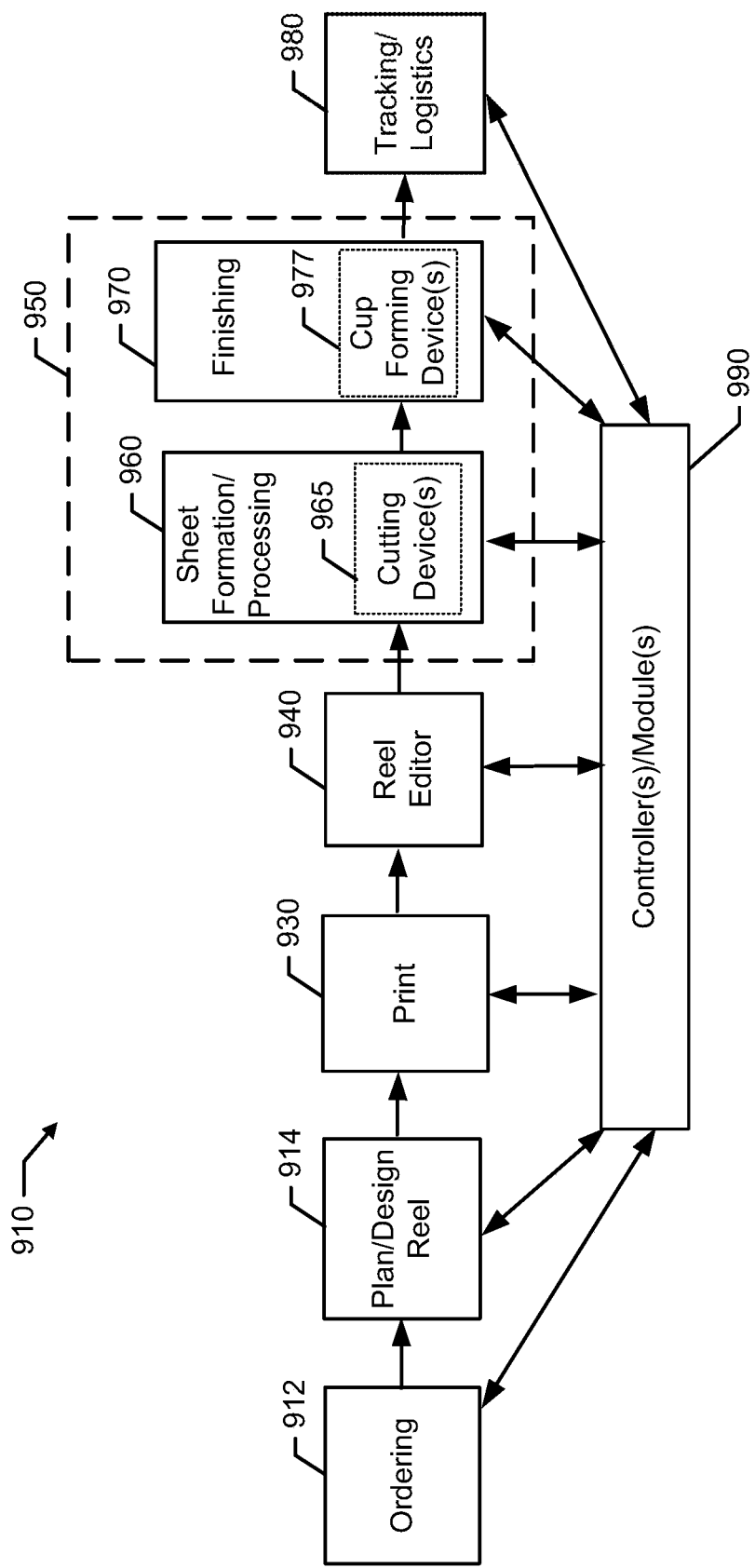
FIG. 13 shows a block diagram of an example cup manufacturing process, in accordance with some embodiments discussed herein.

FIG. 13 shows a block diagram of an example cup manufacturing process. The manufacturing process 910 includes a number of phases that result in a finished cup that is shaped, formed, and printed per the customer's order. The process 910 may include an ordering phase 912, a planning phase 914, a print phase 930, a reel editor phase 940, a sheet formation/processing phase 960, a finishing phase 970, and a tracking/logistics phase 980. Such phases may be similar to the phases described with respect to the manufacturing phase 10 of FIG. 1. In some embodiments, less or more phases or different orders of phases are contemplated. Depending on the desired configuration, one or more controller(s) 990 may be used to control one or more various phases (e.g., various systems/devices therein) of the manufacturing process 910. In some embodiments, one device/system may encompass multiple phases, such as two or more of the printing phase 930, the reel editor phase 940, the sheet formation/processing phase 960, and the finishing phase 970. For example, a cup manufacturing machine 950 may encompass both the sheet formation/processing phase 960 and the finishing phase 970.

In some embodiments, like the manufacturing process 10 described with respect to FIG. 1, the example cup manufacturing process 910 may include one or more cutting devices 965 for cutting one or more sheets (or structures) from the roll of web product. Additionally, in some embodiments, a web forming device may form an updated web, such as prior to processing through the cutting device.

In some embodiments, the cup manufacturing process 910 may include one or more unique devices, such as a cup former 977 that may form part of the finishing phase 970 (or the sheet formation/processing phase 960). The cup former 977, such as using various hardware and/or software, may be configured to form one or more sheets (or structures) into a cup with a desired shape (e.g., the cup former 977 may employ a die-cutter that cuts the sheet into a desired shape and a cup formation device that forms the cylindrical cup shape with a bottom and glues the cup together).

Figure 14:
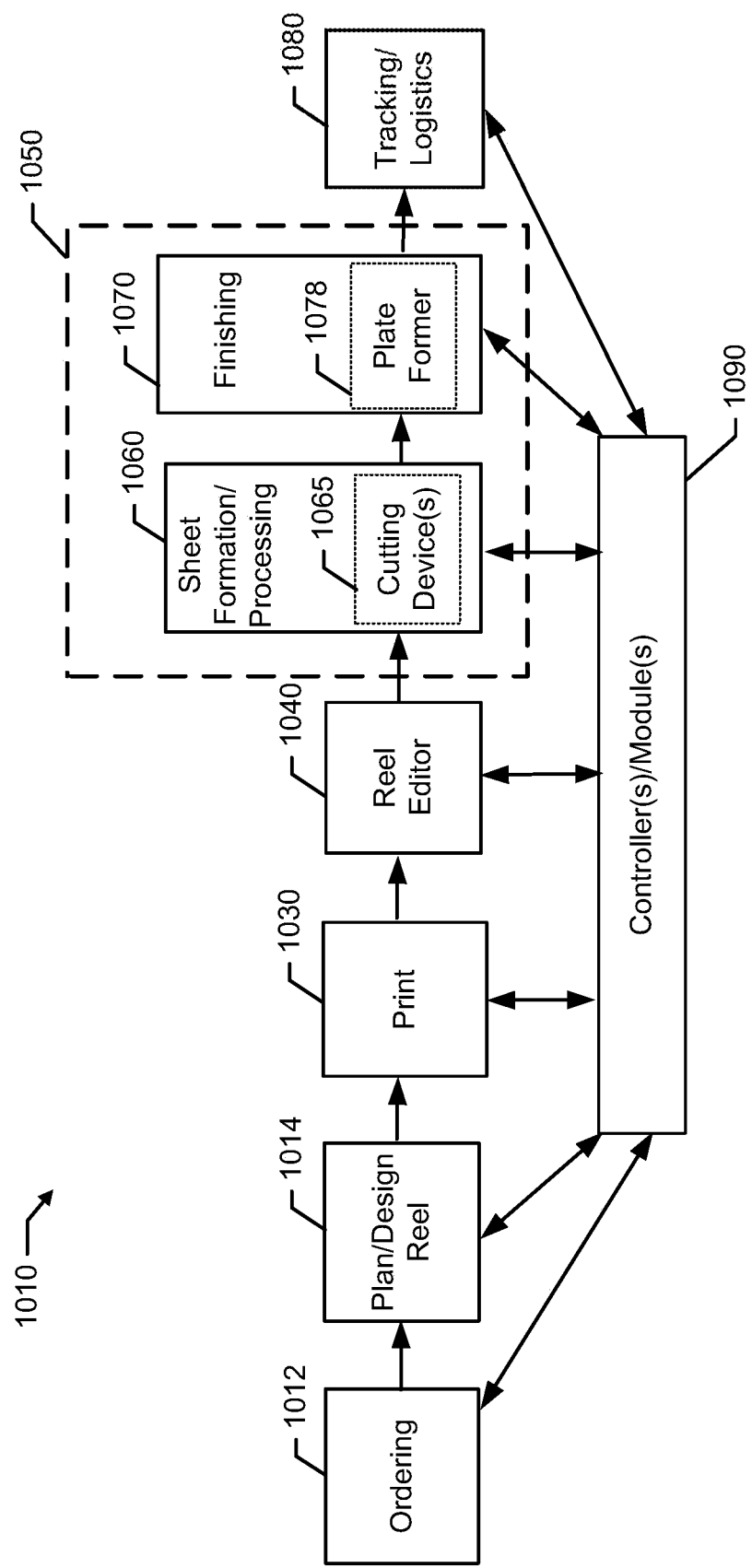
FIG. 14 shows a block diagram of an example paper plate manufacturing process, in accordance with some embodiments discussed herein.

FIG. 14 shows a block diagram of an example paper plate manufacturing process. The manufacturing process 1010 includes a number of phases that result in a finished paper plate that is shaped, formed, and printed per the customer's order. The process 1010 may include an ordering phase 1012, a planning phase 1014, a print phase 1030, a reel editor phase 1040, a sheet formation/processing phase 1060, a finishing phase 1070, and a tracking/logistics phase 1080. Such phases may be similar to the phases described with respect to the manufacturing phase 10 of FIG. 1. In some embodiments, less or more phases or different orders of phases are contemplated. Depending on the desired configuration, one or more controller(s) 1090 may be used to control one or more various phases (e.g., various systems/devices therein) of the manufacturing process 1010. In some embodiments, one device/system may encompass multiple phases, such as two or more of the printing phase 1030, the reel editor phase 1040, the sheet formation/processing phase 1060, and the finishing phase 1070. For example, a plate manufacturing machine 1050 may encompass both the sheet formation/processing phase 1060 and the finishing phase 1070.

In some embodiments, like the manufacturing process 10 described with respect to FIG. 1, the example paper plate manufacturing process 1010 may include one or more cutting devices 1065 for cutting one or more sheets (or structures) from the roll of web product. Additionally, in some embodiments, a web forming device may form an updated web, such as prior to processing through the cutting device.

In some embodiments, the paper plate manufacturing process 1010 may include one or more unique devices, such as a plate former 1078 that may form part of the finishing phase 1070 (or the sheet formation/processing phase 1060). The plate former 1078, such as using various hardware and/or software, may be configured to form one or more sheets (or structures) into a plate with a desired shape (e.g., the plate former 1078 may have a stamping device that stamps the sheet into a desired shape).

Although the above description notes one or more distinctions between the various manufacturing processes 710, 810, 910, 1010 and the manufacturing process 10, other distinctions are contemplated by some embodiments of the present invention. For example, the tracking/logistics phase for each manufacturing process may be different or employ different techniques that allow for efficient manufacturing of the end product. Whether the same or different, various tracking/marking/detecting techniques described herein may be employed with manufacturing of such example products to provide for an efficient manufacturing process.

Example Flowchart(s)

Embodiments of the present invention provide methods, apparatuses and computer program products for controlling manufacturing of one or more products according to various embodiments described herein. Various examples of the operations performed in accordance with embodiments of the present invention will now be provided with reference to FIG. 15.

Figure 15:
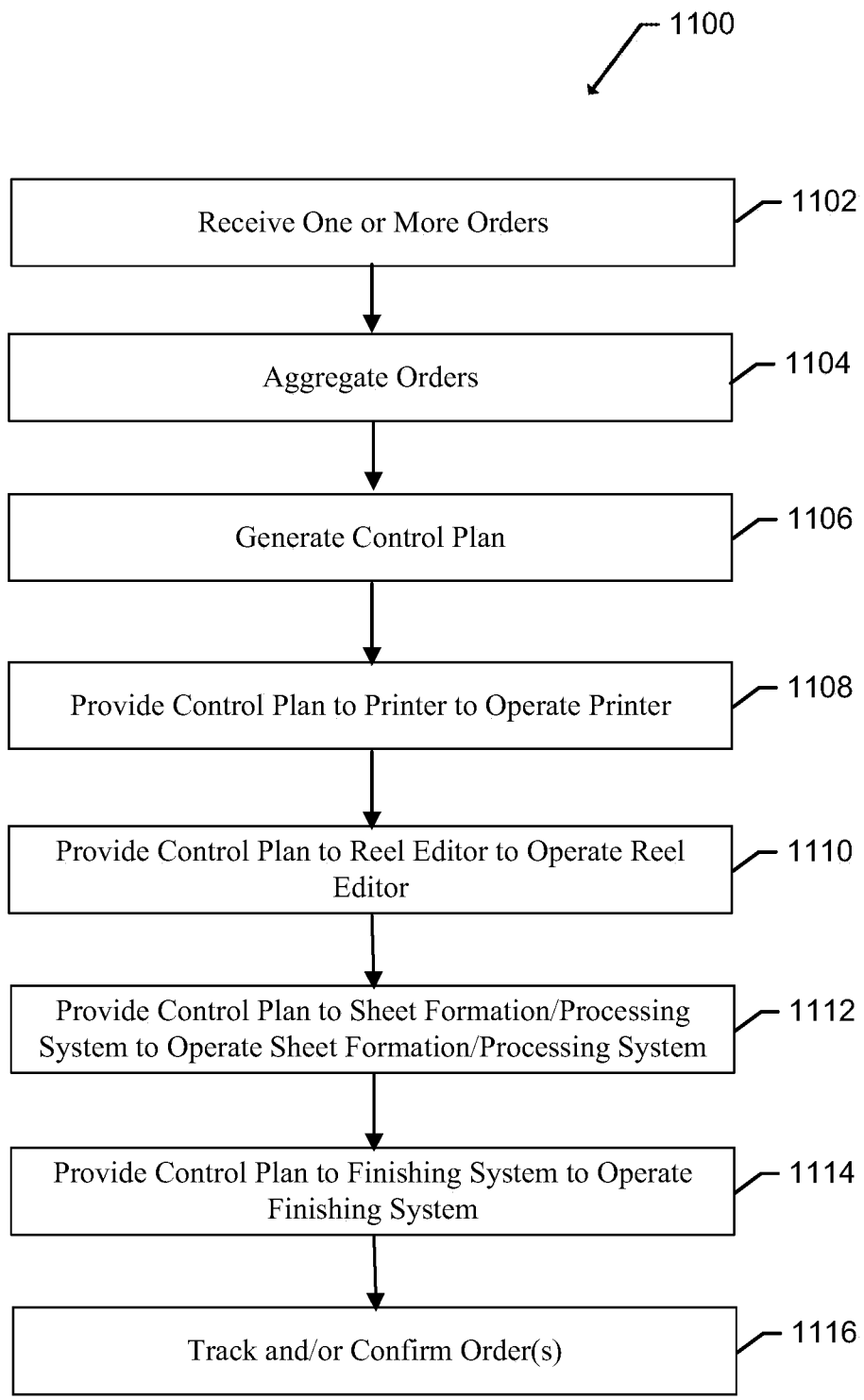
FIG. 15 illustrates a flowchart of an example system for controlling manufacturing of one or more paper-based products, in accordance with some embodiments discussed herein.

FIG. 15 illustrates a flowchart according to an example method for controlling manufacturing of one or more paper-based products according to an example embodiment. The operations illustrated in and described with respect to FIG. 15 may, for example, be performed by, with the assistance of, and/or under the control of one or more of the controller 90, 590, 790, 890, 990, 1090 components of the phases in the described manufacturing processes 10, 510, 710, 810, 910, 1010 and/or modules present in the described platform 100.

The method 1100 may include receiving one or more orders at operation 1102. At operation 1104, the method comprises aggregating a plurality of orders, such as in a database. Then, at operation 1106, the method comprises generating a control plan associated with a roll of web product to include at least a first set of order instructions for at least a first order. At operation 1108, the method includes providing the control plan to at least one printer to cause printing of one or more images on the roll of web product according to the control plan. At operation 1110, the method includes providing the control plan to at least one reel editor to cause editing of the roll of printed web product according to the control plan. At operation 1112, the method includes providing the control plan to the sheet formation/processing system to cause one or more sheets to be formed according to the control plan. At operation 1114, the method includes providing the control plan to the finishing system to cause one or more desired products to be formed. At operation 1116, the method comprises tracking and/or confirming the order, such as using the control plan.

FIG. 15 illustrates a flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the controller 90. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for controlling manufacturing of one or more paper-based products, the system comprising:
    at least one printer configured to print on a roll of web product to form a roll of printed web product;
    at least one sheet formation/processing system that includes at least one cutting arrangement that is configured to cut a portion of the roll of printed web product;
    at least one finishing system for performing finishing operations on the one or more paper-based products;
    at least one controller configured to:
        generate a control plan associated with the roll of web product for at least one order from among a plurality of orders for the one or more paper-based products, wherein each order of the plurality of orders comprises at least one design for at least one paper-based product, wherein the at least one design includes one or more printed images, wherein the control plan includes at least a set of first order instructions for forming one or more first paper-based products from the roll of web product for fulfilling a first order, wherein the set of first order instructions comprises at least printing instructions for controlling operation of the at least one printer and cutting instructions for controlling operation of the at least one cutting arrangement so as to cause formation of one or more first sheet or box structure areas on the roll of web product, wherein each of the first sheet or box structure areas include a first printed image and are used to form the one or more first paper-based products, wherein the first set of order instructions further includes finishing instructions to control operation of the at least one finishing system to cause formation of the one or more first paper-based products;
        provide the control plan to the printer for controlling operation of the printer, wherein the printing instructions of the set of first order instructions of the control plan are utilized to control operation of the printer to cause the first printed image to print at a desired position within each of the first sheet or box structure areas on the roll of web product to form the roll of printed web product;
        provide the control plan to the sheet formation/processing system for controlling operation of the sheet formation/processing system, wherein the cutting instructions of the set of first order instructions of the control plan are utilized to control operation of the cutting arrangement to cause one or more first sheet or box structures with the first printed image therein to be cut from the roll of printed web product, wherein the one or more first sheet or box structures with the first printed image therein are used to form the one or more first paper-based products for fulfilling the first order; and
        provide the control plan to the at least one finishing system for controlling operation of the finishing system, wherein the finishing instructions are utilized to control operation of the finishing system to cause formation of the one or more first paper-based products using the cut one or more first sheet or box structures.

2. The system of claim 1, wherein the at least one sheet formation/processing system further includes a web formation device that is configured to use the roll of printed web product to form an updated web that includes at least one additional layer of material, wherein the updated web is used to form the one or more first paper-based products.

3. The system of claim 1 further comprising at least one finishing system for performing finishing operations on the one or more paper-based products, wherein the at least one controller is configured to provide the control plan to the finishing system for controlling operation of the finishing system, wherein the first set of order instructions further includes finishing instructions to control operation of the finishing system to cause the one or more first paper-based products to be formed using the cut one or more first sheet or box structures.

4. A system for controlling manufacturing of one or more paper-based products, the system comprising:
    at least one controller configured to:
        generate a control plan associated with a roll of web product for at least one order from among a plurality of orders for the one or more paper-based products, wherein each order of the plurality of orders comprises at least one design for at least one paper-based product, wherein the at least one design includes one or more printed images, wherein the control plan includes at least a set of first order instructions for forming one or more first paper-based products from the roll of web product for fulfilling a first order, wherein the set of first order instructions comprises at least printing instructions for controlling operation of at least one printer and cutting instructions for controlling operation of at least one cutting arrangement so as to cause formation of one or more first sheet or box structure areas on the roll of web product, wherein each of the first sheet or box structure areas include a first printed image and are used to form the one or more first paper-based products, wherein the first set of order instructions further includes finishing instructions to control operation of at least one finishing system to cause formation of the one or more first paper-based products;
        provide the control plan to the at least one printer for controlling operation of the printer, wherein the printing instructions of the set of first order instructions of the control plan are utilized to control operation of the printer to cause the first printed image to print at a desired position within each of the first sheet or box structure areas on the roll of web product to form a roll of printed web product;
        provide the control plan to the at least one sheet formation/processing system for controlling operation of the sheet formation/processing system, wherein the at least one sheet formation/processing system includes at least one cutting arrangement that is configured to cut a portion of the roll of printed web product, wherein the cutting instructions of the set of first order instructions of the control plan are utilized to control operation of the cutting arrangement to cause one or more first sheet or box structures with the first printed image therein to be cut from the roll of printed web product, wherein the one or more first sheet or box structures with the first printed image therein are used to form the one or more first paper-based products for fulfilling the first order; and provide the control plan to the at least one finishing system for controlling operation of the finishing system, wherein the finishing instructions are utilized to control operation of the finishing system to cause formation of the one or more first paper-based products using the cut one or more first sheet or box structures.

5. The system of claim 4, wherein the at least one sheet formation/processing system further includes a web formation device that is configured to use the roll of printed web product to form an updated web that includes at least one additional layer of material, wherein the updated web is used to form the one or more first paper-based products.

6. The system of claim 4, wherein the at least one sheet formation/processing system comprises a corrugator that is configured to form corrugated board web using the roll of printed web product, wherein the first paper-based product is a corrugated box with the first printed image.

7. The system of claim 4, wherein the at least one controller is configured to provide the control plan to at least one finishing system for controlling operation of the finishing system, wherein the first set of order instructions further includes finishing instructions to control operation of the finishing system to cause the one or more first paper-based products to be formed using the cut one or more first sheet or box structures.

8. The system of claim 4, wherein the at least one controller is configured to determine if the one or more first paper-based products formed by the finishing system satisfies the first order.

9. The system of claim 4, wherein the finishing system comprises a folding device that is configured to fold and glue the one or more first sheet or box structures for use in formation of the one or more first paper-based products, wherein the one or more first paper-based products are one or more folded cartons that each include at least the first printed image.

10. The system of claim 4, wherein the finishing system comprises:
a tubing device that is configured to form the one or more first sheet or box structures into a tube; and
a bottoming device that is configured to form a bottom of the tube for use in formation of the one or more first paper-based products,
wherein the one or more first paper-based products are one or more industrial bags that each include at least the first printed image.

11. The system of claim 4, wherein the finishing system comprises a cup forming device that is configured to form the one or more first sheet or box structures into one or more cups, wherein the one or more first paper-based products are one or more cups that each include the first printed image.

12. The system of claim 4, wherein the finishing system comprises a plate forming device that is configured to form the one or more first sheet or box structures into one or more plates, wherein the one or more first paper-based products are one or more plates that each include the first printed image.

13. The system of claim 4, wherein the at least one controller is configured to provide the control plan to at least one reel editor for controlling operation of the reel editor, wherein the control plan includes editing instructions to control operation of the reel editor to cause one or more portions of the roll of printed web product to be removed.

14. The system of claim 13, wherein the at least one controller is configured to update the control plan based on the one or more portions of the roll of printed web product that were removed.

15. The system of claim 4, wherein the at least one controller is configured to receive one or more of the plurality of orders for the one or more paper-based products.

16. The system of claim 4, wherein the at least one controller is configured to track the one or more first sheet or box structures after formation.

17. The system of claim 4, wherein the at least one controller is configured to determine if the one or more first sheet or box structures formed by the sheet formation processing system satisfies the first order.

18. The system of claim 4, wherein the control plan for the roll of web product includes at least a set of second order instructions for forming one or more second paper-based products from the roll of web product for fulfilling a second order, wherein the set of second order instructions comprises at least second printing instructions for controlling operation of the at least one printer and second cutting instructions for controlling operation of the at least one cutting arrangement so as to cause formation of one or more second sheet or box structure areas on the roll of web product, wherein each of the second sheet or box structure areas include a second printed image and are used to form the one or more second paper-based products.

19. The system of claim 18, wherein the set of first order instructions and the set of second order instructions are configured to cause the one or more first sheet or box structure areas and the one or more second sheet or box structure areas to be formed adjacent to each other in a width direction on the roll of web product.

20. A method for controlling manufacturing of one or more paper-based products, the method comprising:
generating a control plan associated with a roll of web product for at least one order from among a plurality of orders for the one or more paper-based products, wherein each order of the plurality of orders comprises at least one design for at least one paper-based product, wherein the at least one design includes one or more printed images, wherein the control plan includes at least a set of first order instructions for forming one or more first paper-based products from the roll of web product for fulfilling a first order, wherein the set of first order instructions comprises at least printing instructions for controlling operation of at least one printer and cutting instructions for controlling operation of at least one cutting arrangement so as to cause formation of one or more first sheet or box structure areas on the roll of web product, wherein each of the first sheet or box structure areas include a first printed image and are used to form the one or more first paper-based products, wherein the first set of order instructions further includes finishing instructions to control operation of at least one finishing system to cause formation of the one or more first paper-based products;
controlling, using the printing instructions of the set of first order instructions of the control plan, the at least one printer to cause the first printed image to print at a desired position within each of the first sheet or box structure areas on the roll of web product to form a roll of printed web product;
controlling, using the cutting instructions of the set of first order instructions of the control plan, the at least one cutting arrangement of at least one sheet formation/ processing system-to cause one or more first sheet or box structures with the first printed image therein to be cut from the roll of printed web product, wherein the one or more first sheet or box structures with the first printed image therein are used to form the one or more first paper-based products for fulfilling the first order; and controlling, using the finishing instructions of the set of first order instructions of the control plan, the at least one finishing system to cause formation of the one or more first paper-based products using the cut one or more first sheet or box structures.

\* \* \* \* \*

UNITED STATES PATENT AND TRADEMARK OFFICE
CERTIFICATE OF CORRECTION

PATENT NO. : 11,449,290 B2
APPLICATION NO. : 16/033348
DATED : September 20, 2022
INVENTOR(S) : Robert Dennis Seay It is certified that error appears in the above-identified patent and that said Letters Patent is hereby corrected as shown below:

In the Claims

Column 31, Line 17, Claim 1, the text beginning with the words "at least one finishing system..." and ending at Column 31, Line 18 with the word "products;" should be deleted Column 31, Line 32, Claim 1, this should read:
-- of at least one printer and cutting instructions for --
Instead of:
"of the at least one printer and cutting instructions for"

Column 31, Line 33, Claim 1, this should read:
-- controlling operation of at least one cutting --
Instead of:
"controlling operation of the at least one cutting"

Column 31, Line 39, Claim 1, this should read:
-- products; --
Instead of:
"products, wherein the first set of order instructions"

Column 31, Line 39, Claim 1, the text beginning with the words "wherein the first set one finishing system..." and ending at Column 31, Line 43 with the word "products;" should be deleted Column 31, Line 51, Claim 1, this should read:
-- roll of printed web product; and --
Instead of:
"roll of printed web product;"

Signed and Sealed this
Twentieth Day of December, 2022

Katherine Kelly Vidal
*Director of the United States Patent and Trademark Office*

CERTIFICATE OF CORRECTION (continued)
U.S. Pat. No. 11,449,290 B2

Column 31, Line 63, Claim 1, this should read:
-- filling the first order. --
Instead of:
"filling the first order; and"

Column 31, Line 64, Claim 1, the text beginning with the words "provide the control plan..." and ending at Column 32, Line 3 with the word "structure." should be deleted Column 32, Line 18, Claim 3, this should read:
-- products to be formed using the one or more first sheet --
Instead of:
"products to be formed using the cut one or more first sheet"

Column 32, Line 42, Claim 4, this should read:
-- products; --
Instead of:
"products, wherein the first set of order instructions"

Column 32, Line 42, Claim 4, the text beginning with the words "wherein the first set of order instructions..." and ending at Column 32, Line 46 with the word "products;" should be deleted Column 32, Line 47, Claim 4, this should read:
-- provide the control plan to at least one printer for --
Instead of:
"provide the control plan to the at least one printer for"

Column 32, Line 54, Claim 4, this should read:
-- product to form a roll of printed web product; and --
Instead of:
"product to form a roll of printed web product;"

Column 32, Line 55, Claim 4, this should read:
-- provide the control plan to at least one sheet --
Instead of:
"provide the control plan to the at least one sheet"

Column 33, Line 3, Claim 4, this should read:
-- order. --
Instead of:
"order; and"

Column 33, Line 4, Claim 6, the text beginning with the words "provide the control plan..." and ending at Column 33, Line 10 with the word "structures." should be deleted

CERTIFICATE OF CORRECTION (continued)
U.S. Pat. No. 11,449,290 B2

Column 33, Line 28, Claim 7, this should read:
-- products to be formed using the one or more first sheet --
Instead of:
"products to be formed using the cut one or more first sheet"

Column 33, Line 30, Claim 8, this should read:
-- The system of claim 7, wherein the at least one --
Instead of:
"The system of claim 4, wherein the at least one"

Column 33, Line 34, Claim 9, this should read:
-- The system of claim 7, wherein the finishing system --
Instead of:
"The system of claim 4, wherein the finishing system"

Column 33, Line 41, Claim 10, this should read:
-- The system of claim 7, wherein the finishing system --
Instead of:
"The system of claim 4, wherein the finishing system"

Column 33, Line 51, Claim 10, this should read:
-- The system of claim 7, wherein the finishing system --
Instead of:
"The system of claim 4, wherein the finishing system"

Column 33, Line 56, Claim 11, this should read:
-- The system of claim 7, wherein the finishing system --
Instead of:
"The system of claim 4, wherein the finishing system"

Column 34, Line 53, Claim 20, this should read:
-- used to form the one or more first paper-based products; --
Instead of:
"used to form the one or more first paper-based products,"

Column 34, Line 54, Claim 20, the text beginning with the words "wherein the first set of order instructions..." and ending at Column 34, Line 57 with the word "products;" should be deleted Column 34, Line 59, Claim 20, this should read:
-- first order instructions of the control plan, at least --
Instead of:
"first order instructions of the control plan, the at least"

Column 34, Line 63, Claim 20, this should read:
-- of printed web product; and --

Instead of:
"of printed web product;"

Column 34, Line 65, Claim 20, this should read:
-- order instructions of the control plan, at least one --
Instead of:
"order instructions of the control plan, the at least one"

Column 35, Line 5, Claim 20, this should read:
-- first paper-based products for fulfilling the first order. --
Instead of:
"first paper-based products for fulfilling the first order;"

Column 35, Line 6, Claim 20, the text beginning with the word "and" and ending at Column 35, Line 11 with the words "more first sheet or box structures." should be deleted